(12) United States Patent
Dhama et al.

(10) Patent No.: US 12,271,352 B2
(45) Date of Patent: Apr. 8, 2025

(54) METHOD AND SYSTEM FOR ENTITY RESOLUTION

(71) Applicant: MASTERCARD INTERNATIONAL INCORPORATED, Purchase, NY (US)

(72) Inventors: Gaurav Dhama, Gurgaon (IN); Vikas Bishnoi, Jodhpur (IN); Himanshi Charotia, New Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 96 days.

(21) Appl. No.: 17/486,550

(22) Filed: Sep. 27, 2021

(65) Prior Publication Data

US 2022/0100720 A1    Mar. 31, 2022

(30) Foreign Application Priority Data

Sep. 28, 2020    (IN) .............................. 202021042074

(51) Int. Cl.
*G06F 16/215*        (2019.01)
*G06F 16/25*         (2019.01)
*G06F 18/2323*       (2023.01)
*G06F 18/2413*       (2023.01)
*G06N 3/04*          (2023.01)

(52) U.S. Cl.
CPC .......... *G06F 16/215* (2019.01); *G06F 16/258* (2019.01); *G06F 18/2323* (2023.01); *G06F 18/24147* (2023.01); *G06N 3/04* (2013.01)

(58) Field of Classification Search
CPC .. G06F 16/215; G06F 16/258; G06F 18/2323; G06F 18/24147; G06N 3/04; G06N 5/01; G06N 3/045; G06N 3/088
See application file for complete search history.

(56) References Cited

U.S. PATENT DOCUMENTS

2019/0377819 A1\* 12/2019 Filliben ................ G06N 3/084
2021/0019325 A1\*  1/2021 Edge .................... G06F 16/254
2021/0076224 A1\*  3/2021 Yang ...................... G06N 3/08

\* cited by examiner

*Primary Examiner* — Richard L Bowen
*Assistant Examiner* — Aryan D Toughiry
(74) *Attorney, Agent, or Firm* — LOZA & LOZA, LLP

(57) ABSTRACT

A method for facilitating entity resolution is provided. A server generates a graph based on a first dataset comprising a first entity and a second dataset comprising a plurality of entities. Each node in the generated graph corresponds to the first entity or one of the plurality of entities. The server generates a plurality of embeddings for the plurality of nodes in the generated graph. Each of the plurality of embeddings represents an entity as a point in a d-dimensional embedding space. The server identifies a set of nearest neighbors for the first entity based on the plurality of embeddings. The server determines a similarity metric for each of the identified nearest neighbor with respect to the first entity. The server associates the first entity with a second entity of the second dataset that corresponds to a nearest neighbor in the set of nearest neighbors.

11 Claims, 20 Drawing Sheets

| | N3 | N5 | N7 | N8 | ... | Nn |
|---|---|---|---|---|---|---|
| | 0.5 | 0.5 | 0.4 | 0.0 | | 0.0 |
| | 0.4 | 0.3 | 0.4 | -0.6 | | -0.7 |
| | -0.1 | -0.1 | -0.5 | 0.9 | | 0.9 |
| | -0.7 | -0.7 | -0.7 | -0.7 | | -0.6 |
| | 0.9 | 0.8 | 0.9 | 0.9 | | 0.9 |
| | 0.0 | 0.1 | 0.7 | -0.6 | | -0.6 |
| | 0.2 | 0.2 | 0.2 | 0.0 | | 0.1 |
| | -0.8 | -0.8 | -0.6 | 0.9 | | 0.8 |
| | 310b | 310d | 310e | 310h | | 310n |

| N5 | 0.5 | 0.3 | -0.1 | -0.7 | 0.8 | 0.1 | 0.2 | -0.8 | 310d |
|----|-----|-----|------|------|-----|-----|-----|------|------|
| N7 | 0.4 | 0.4 | -0.5 | -0.7 | 0.9 | 0.7 | 0.2 | -0.6 | 310e |
| N8 | 0.0 | -0.6 | 0.9 | -0.7 | 0.9 | -0.6 | 0.0 | 0.9 | 310h |

314

| N3 | 0.5 | 0.4 | -0.1 | -0.7 | 0.9 | 0.0 | 0.2 | -0.8 |
|----|-----|-----|------|------|-----|-----|-----|------|

| Name_1 | Name_2 | Similarity Metric |
|---|---|---|
| Merchant ABC | Merchant AB | 1 |
| Merchant ABC | Merchant PQR | 0.35 |
| Merchant ABC | Merchant XYZ | 0.15 |

320

| Name | Match Value |
|---|---|
| Merchant ABC | 1 |

| Name | Street Address | City | State |
|---|---|---|---|
| 134 Domino's | 1600 Pennsylvania Avenue | Houston | Texas |
| Domino's #11 | 145 Plaza oak | Houston | Texas |
| 111 Walmart | 34 Peter pan road | Independence | Kansas |

504

| Name | Street Address | City | State |
|---|---|---|---|
| Dominos 134 | 1600-6003 Penn ave. | Houston | Texas |
| Mcdonalds | 34 Sean road | Milford | Connecticut |
| 111 Walmart | 34 Peter pan road | Independence | Kansas |

506

| Name | Match Value |
|---|---|
| 134 Domino's | 0 |
| Donald shoes | 0 |
| 111 Walmart | 1 |

FIG. 5A

| | | | | | | |
|---|---|---|---|---|---|---|
| Dominos 134 | 0.5 | 0.4 | -0.1 | -0.7 | 0.9 | 0.0 | 0.2 | -0.8 | 512a |
| Texas | -0.4 | 0.5 | 0.1 | -0.6 | 0.1 | 0.7 | 0.5 | -0.3 | 512b |
| 1600 | 0.5 | 0.1 | 0.2 | 0.2 | 0.0 | -0.5 | 0.4 | -0.8 | 512c |
| 134 Domino's | 0.5 | 0.3 | -0.1 | -0.7 | 0.8 | 0.1 | 0.2 | -0.8 | 512d |
| Domino's #11 | 0.4 | -0.5 | -0.7 | 0.9 | 0.7 | 0.2 | -0.6 | 512n-1 |
| Domino Shoes | 0.0 | -0.6 | 0.9 | -0.7 | 0.9 | -0.6 | 0.0 | 0.9 | 512n |

FIG. 5D

| Name_1 | Address_1 | City_1 | State_1 | Name_2 | Address_2 | City_2 | State_2 | Similarity Metric |
|---|---|---|---|---|---|---|---|---|
| Dominos 134 | 1600-1603 Penn ave. | Houston | Texas | 134 Domino's | 1600 Pennsylvania Avenue | Houston | Texas | 1 |
| Dominos 134 | 34 Peter Pan Rd | Independence | Kansas | Domino's #11 | 145 Plaza oak | Houston | Texas | 0.72 |
| Dominos 134 | 34 Peter Pan Rd | Independence | Kansas | Domino Shoes | 13 Harvey Ave. | Houston | Texas | 0.15 |

METHOD AND SYSTEM FOR ENTITY RESOLUTION

CLAIM OF FOREIGN PRIORITY

The present application for patents claims priority to Indian Patent Application number 202021042074, filed Sep. 28, 2020, and which is incorporated by reference hereto, and which also assigned to assignee hereof.

BACKGROUND

Field of the Disclosure

Various embodiments of the disclosure relate generally to entity resolution systems. More specifically, various embodiments of the disclosure relate to merchant entity resolution using graph embedding.

Description of the Related Art

With the advancement of technology, electronic transactions have become a preferred means for making payments. Typically, an electronic transaction involves exchange of data among different, remotely located entities via one or more online services. Such entities may possess valuable databases that contain information relating to various consumers and merchants involved in the transactions. For example, in payment transactions, the entities involved are a merchant, an acquirer, a payment network, and an issuer. Each of the acquirer, the payment network, and the issuer maintains a standalone database that includes information of carious merchants involved in the transactions and transaction details corresponding to these merchants. For transaction processing at the payment network, the payment network may be required to map merchant details in transaction data of a transaction to merchant details in a stored database. In one scenario, when the payment network receives a transaction request corresponding to a merchant from the acquirer, the merchant details stored in respective databases of the acquirer and the payment network may be incomplete, inaccurate, or different. For example, a transaction may list a merchant to be 'Dominos 134' as per the database of the acquirer, and the same merchant may be listed as '134 Domino's' in the stored database of the payment network, resulting in a merchant mismatch or ambiguation in records. Due to the mismatch, the payment network may update the respective database to add a new record for the merchant 'Dominos 134', thus resulting in duplicate records for the same merchant.

The task of disambiguating records that correspond to real world entities across and within databases is called entity resolution. The problems associated with the entity resolution are the volume of data, the quality of transaction data, data fragmentation, schema variations, or the like. Moreover, the acquirer and the payment network may not be able to share their databases with each other due to personally identifiable information which is viewed as a business asset. Use of natural language processing (NLP) for entity resolution is a known solution for the abovementioned problems. However, the major drawback with the NLP is the low processing speed when the volume of data is high, resulting in an increase in time complexity for execution of entity resolution, which is undesirable.

In light of the foregoing, there is a need for a technical solution that solves the abovementioned problems and resolves entity resolution in transactions with reduced time complexity and increased accuracy.

SUMMARY

In an embodiment of the present disclosure, a method for facilitating entity resolution is disclosed. A graph is generated by a server based on a first dataset and a second dataset. The graph comprises a plurality of nodes and a plurality of edges connecting the plurality of nodes. The first dataset comprises a first entity and the second dataset comprises a plurality of entities. Each node in the generated graph corresponds to the first entity or one of the plurality of entities. A plurality of embeddings are generated by the server for the plurality of nodes in the generated graph. Each of the plurality of embeddings represents the first entity or one of the plurality of entities as a point in a d-dimensional embedding space. A set of nearest neighbors is identified by the server for the first entity based on the plurality of embeddings. A similarity metric is determined by the server with respect to the first entity for each nearest neighbor in the set of nearest neighbors. The similarity metric for each nearest neighbor measures a degree of similarity between the first entity and the corresponding nearest neighbor. Further, the first entity is associated by the server with a second entity of the second dataset that corresponds to a nearest neighbor in the set of nearest neighbors. The first entity is associated with the second entity based on the determined similarity metric for each nearest neighbor.

In an embodiment of the present disclosure, a system for facilitating entity resolution is disclosed. A system includes a server configured to generate a graph based on a first dataset and a second dataset. The graph includes a plurality of nodes and a plurality of edges that connect the plurality of nodes. The first dataset includes a first entity and the second dataset includes a plurality of entities. Each node in the generated graph corresponds to the first entity or one of the plurality of entities. The server is configured to generate a plurality of embeddings for the plurality of nodes in the generated graph. Each of the plurality of embeddings represents the first entity or one of the plurality of entities as a point in a d-dimensional embedding space. The server is configured to identify a set of nearest neighbors for the first entity based on the plurality of embeddings, and determine a similarity metric with respect to the first entity for each nearest neighbor in the set of nearest neighbors. The similarity metric for each nearest neighbor measures a degree of similarity between the first entity and the corresponding nearest neighbor. The server is further configured to associate the first entity with a second entity of the second dataset that corresponds to a nearest neighbor of the set of nearest neighbors. The first entity is associated with the second entity based on the similarity metric determined for each nearest neighbor.

In an embodiment of the present disclosure, a method for facilitating merchant entity resolution in transactions is disclosed. A graph is generated by a payment network server based on a transaction dataset comprising a first merchant entity and a stored dataset comprising a plurality of merchant entities. The graph includes a plurality of nodes and a plurality of edges connecting the plurality of nodes. Each node in the generated graph corresponds to the first merchant entity or one of the plurality of merchant entities. A plurality of embeddings are generated by the payment network server for the plurality of nodes in the generated graph. Each of the plurality of embeddings represents the first merchant entity or one of the plurality of merchant entities as a point in a d-dimensional embedding space. A set of nearest neighbors is identified by the payment network server for the first merchant entity based on the plurality of embeddings. A similarity metric is determined by the payment network server with respect to the first merchant entity for each nearest neighbor in the set of nearest neighbors. The similarity metric for each nearest neighbor measures a degree of similarity between the first merchant entity and the corresponding nearest neighbor. The first merchant entity is associated by the payment network server with a second merchant entity of the stored dataset that corresponds to a nearest neighbor in the set of nearest neighbors. The first merchant entity is associated with the second merchant entity based on the similarity metric determined for each nearest neighbor.

BRIEF DESCRIPTION OF DRAWINGS

Various embodiments of the present disclosure are illustrated by way of example, and not limited by the appended figures, in which like references indicate similar elements, and in which:

FIGS. 3A-3F are schematic diagrams that collectively illustrate various operations executed by the payment network server for entity resolution, in accordance with an exemplary embodiment of the present disclosure;

FIGS. 5A-5F, collectively represent an exemplary scenario that illustrates merchant entity resolution implemented by the payment network server for processing the first transaction, in accordance with an exemplary embodiment of the present disclosure;

Figure 1:
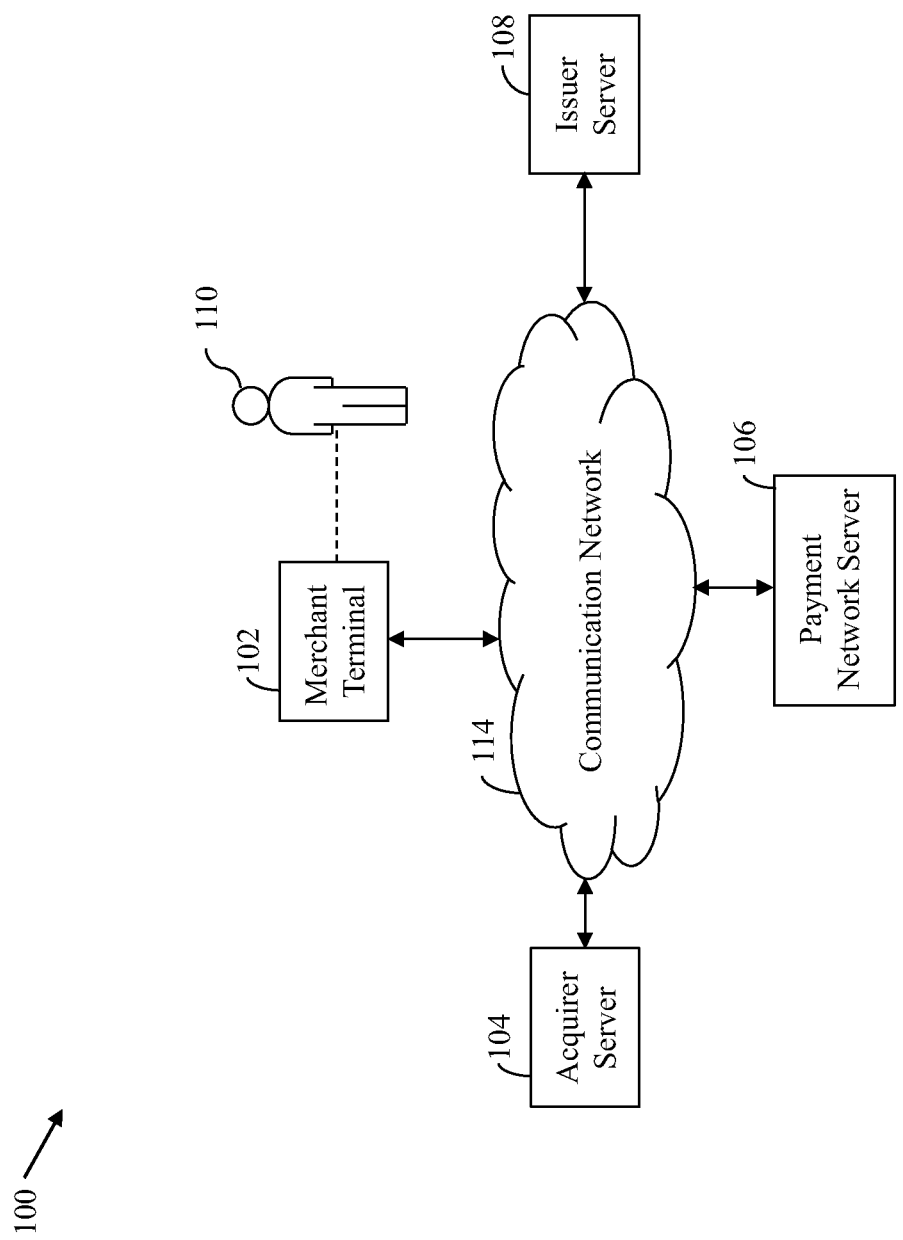
FIG. 1 is a block diagram that illustrates an exemplary environment for implementing entity resolution, in accordance with an exemplary embodiment of the present disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the present disclosure.

DETAILED DESCRIPTION OF EMBODIMENTS

The present disclosure is best understood with reference to the detailed figures and description set forth herein.

Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

A system that is based on natural language processing (NLP) may be used for entity resolution for large volume of data in transactions. However, there is no way to reduce time complexity and maintain quality in transaction data with certainty.

Various embodiments of the present disclosure provide a method and a system that solve the aforementioned problems by utilizing graph embedding technique for entity resolution. A server (for example, an acquirer server, a payment network server, or an issuer server) may be integrated with graph embedding functionality for entity resolution. The server facilitates entity resolution (primarily, merchant entity resolution) in transactions. The server receives a transaction request for a transaction. The transaction request includes details of a first entity (e.g., a first merchant entity) involved in the transaction. The server retrieves a stored dataset that includes details of a plurality of entities (e.g., a plurality of merchant entities) that have interacted with the server in the past. The server generates a graph based on the details of the first entity and the plurality of entities in the stored dataset. The graph includes a plurality of nodes and a plurality of edges connecting the plurality of nodes. Each node in the generated graph corresponds to the first entity or one of the plurality of entities. The server generates a plurality of embeddings for the plurality of nodes in the generated graph. Each of the plurality of embeddings represents the first entity or one of the plurality of entities as a point in a d-dimensional embedding space. The server identifies a set of nearest neighbors for the first entity based on the plurality of embeddings. The server determines a similarity metric with respect to the first entity for each of the identified nearest neighbor. The similarity metric indicates a degree of similarity between the first entity and each of the identified nearest neighbor. The server associates the first entity with a second entity included in the stored dataset such that the second entity corresponds to one of the identified nearest neighbors in the set of nearest neighbors. The server associates the first entity with the second entity based on the determined similarity metric for each of the identified nearest neighbor.

Thus, the method and system of the present disclosure enable the use of graph embedding to implement fast merchant entity resolution for transaction processing.

Terms Description (in Addition to Plain and Dictionary Meaning)

Transaction request is a request that is generated based on a transaction initiated by a user. The transaction request may indicate a transaction amount of the transaction, a purchase category of the transaction, a time-stamp of the transaction, details of a merchant involved in the transaction, or the like. For example, a first transaction request may be generated when the user makes a purchase of a product (e.g., a mobile phone) from a merchant store of a first merchant. The first transaction request may indicate a price of the product, a purchase category (e.g., 'Electronics'), details of the first merchant, or the like.

Graph embedding is a technique that allows representation of a graph, a sub-graph, or nodes in the graph to low-dimensional embeddings that capture key features of the graph, the sub-graph, or the nodes while reducing the dimensionality.

Nearest neighbor refers to a point in a set of points that is closest or most similar to a given point. Nearest neighbors for a first entity (or a first node) in a graph are identified based on embeddings of the first entity and remaining entities (or remaining nodes) of the graph.

Similarity metric is a proximity measure that indicates a degree of similarity between a pair of embeddings (or embedding vectors). The proximity measure may be cosine similarity, Euclidean distance, or the like. In order to measure similarity between two entities, two entities are typically embedded in a vector space.

Issuer is a financial institution which establishes and maintains user accounts of several users. The issuer authorizes and settles transactions in accordance with various payment network regulations and local legislation.

Payment networks, such as those operated by Mastercard®, process transactions between acquirers and issuers. Processing by a payment network includes steps of authorization, clearing, and settlement.

Server is a physical or cloud data processing system on which a server program runs. The server may be implemented in hardware or software, or a combination thereof. In one embodiment, the server may be implemented in computer programs executing on programmable computers, such as personal computers, laptops, or a network of computer systems. The server may correspond to one of an acquirer server, a payment network server, or an issuer server.

FIG. 1 is a block diagram that illustrates an exemplary environment 100 for implementing entity resolution, in accordance with an exemplary embodiment of the present disclosure. The environment 100 includes a merchant terminal 102, an acquirer server 104, a payment network server 106, an issuer server 108, and a user 110. The merchant terminal 102, the acquirer server 104, the payment network server 106, and the issuer server 108 may communicate with each other by way of a communication network 112 or through separate communication networks established therebetween.

The merchant terminal 102 is a computing device operated by a merchant. The merchant may be associated with one or more physical stores and/or online stores. In a non-limiting example, it is assumed that the merchant is associated with a physical store and that the user 110 uses a payment mode to make a purchase of a product from the merchant at the physical store. In another embodiment, the merchant may be associated with a digital or an electronic store. In such a scenario, the user 110 may purchase products and/or avail services from the merchant by a way of a web application or a mobile application that runs or is executed on a user device (not shown) of the user 110. Examples of the merchant terminal 102 may include, but are not limited to, a point-of-sale (POS) device, a point-of-purchase (POP) device, a point-of-interaction (POI) device, a payment gateway, or the like. The merchant terminal 102 enables the user 110 to purchase products and/or services from the merchant. The merchant terminal 102 communicates, to a server, details pertaining to various transactions initiated by the use of the merchant terminal 102.

The acquirer server 104 is a computing server operated by a first acquirer associated with the merchant. The acquirer server 104 maintains a first financial account of the merchant and process transactions that are associated with the first financial account of the merchant.

The payment network server 106 is a computing server that is operated by a payment network. The payment network is an intermediate entity between acquirers (for example, the first acquirer) and issuers (e.g., an issuer associated with the issuer server 108) for processing transactions. The payment network server 106 is configured to store details of various merchants in its database. The payment network server 106 is further configured to execute (or implement) merchant entity resolution for the electronic transactions. Various components of the payment network server 106 are explained in conjunction with FIG. 2A.

The issuer server 108 is a computing server that is operated by the issuer. The issuer may be a financial institution that manages payment accounts and digital wallets of multiple users (such as the user 110). Account details of the payment accounts established with the issuer may be stored as account profiles. The issuer server 108 may credit and debit the payment accounts or the digital wallets based on purchases made by the users from their corresponding payment accounts or digital wallets.

Examples of the acquirer server 104, the payment network server 106, and the issuer server 108 may include, but are not limited to, computers, laptops, mini-computers, mainframe computers, any non-transient and tangible machines that can execute a machine-readable code, cloud-based servers, distributed server networks, a network of computer systems, or a combination thereof.

The user 110 is an individual, who may be associated with various payment modes, for example, a first payment mode. In one example, the first payment mode of the user 110 may be a first transaction card linked to a first payment account of the user 110 that is maintained at a financial institution, such as the issuer. In another example, the first payment mode of the user 110 may be a first digital wallet maintained at the issuer. Examples of the first digital wallet may include, but are not limited to, Apple Pay Cash®, or the like. The user 110 may use the first payment mode to perform various transactions for purchasing one or more products or services from various merchants.

The communication network 112 is a medium through which content and messages are transmitted between the merchant terminal 102, the acquirer server 104, the payment network server 106, the issuer server 108, and other entities that are pursuant to one or more standards for the interchange of transaction requests. Examples of the communication network 112 include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 112 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, various transaction requests for transactions initiated at the merchant terminal 102 may be received by the payment network server 106 from the acquirer server 104. The transaction requests may be requests to authorize the transactions. Each transaction request may be indicative of a corresponding transaction amount, merchant details (e.g., name and address of a merchant), or the like. In order to process the transaction, the payment network server 106 may be required to match the received merchant details with stored data of merchants in its database. In a scenario where there is a mismatch between the received merchant details and stored data of merchants, the payment network server 106 may implement merchant entity resolution for processing the corresponding transaction. The payment network server 106 uses a graph embedding technique for executing the merchant entity resolution. Various operations executed by the payment network server 106 to implement entity resolution using the graph embedding technique are explained in detail in conjunction with FIGS. 3A-3F.

Figure 2A:
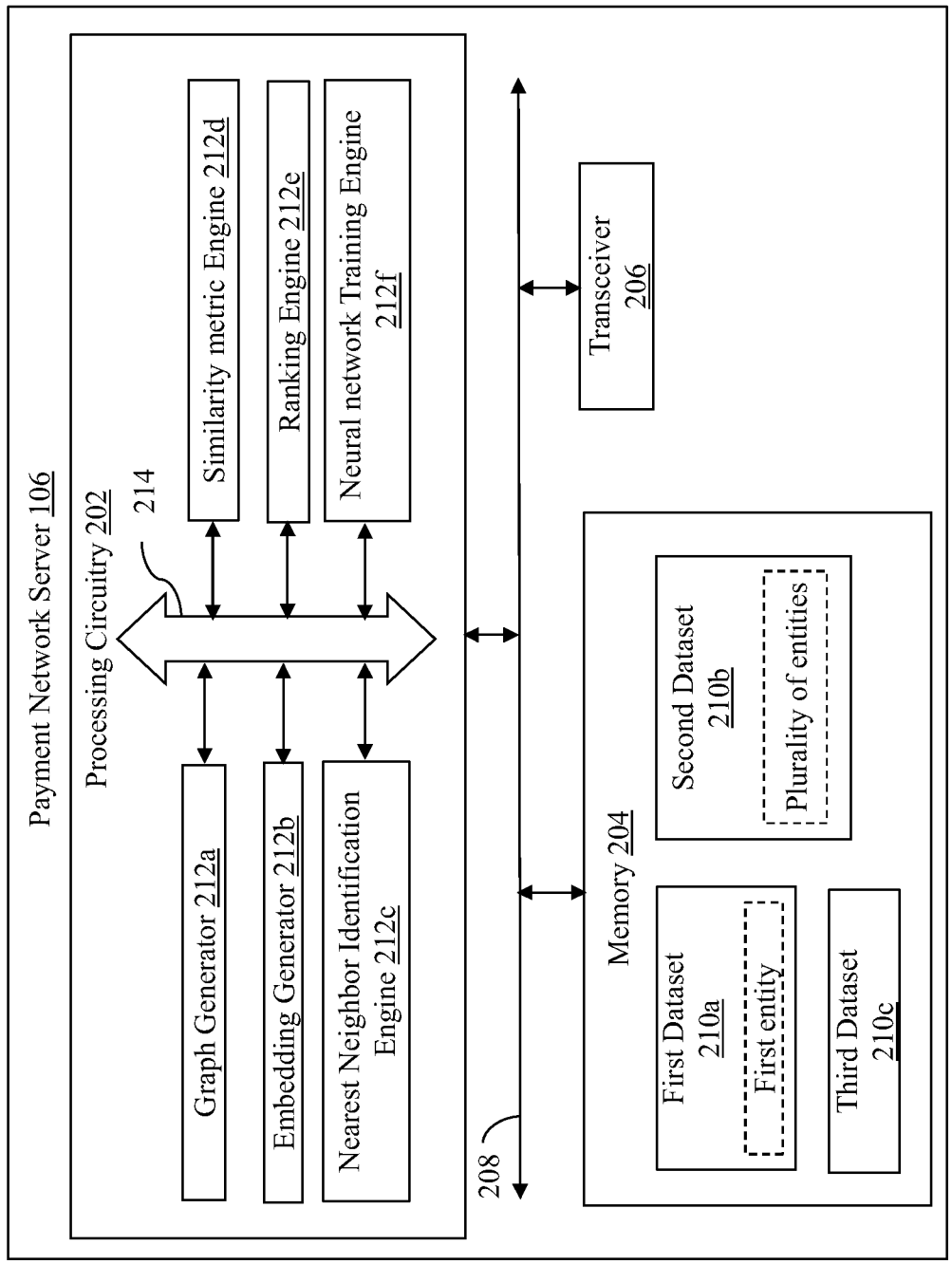
FIG. 2A is a block diagram that represents a payment network server of FIG. 1, in accordance with an exemplary embodiment of the present disclosure.

FIG. 2A is a block diagram that illustrates the payment network server 106, in accordance with an exemplary embodiment of the present disclosure. The payment network server 106 may include processing circuitry 202, a memory 204, and a transceiver 206. The processing circuitry 202, the memory 204, and the transceiver 206 may communicate with each other by way of a communication bus 208.

The processing circuitry 202 may include suitable logic, circuitry, interfaces, and/or code, executed by the circuitry, to process various transactions. The processing circuitry 202 is configured to receive transaction requests from the acquirer server 104 by way of the communication network 112. The processing circuitry 202 processes the received transaction requests and communicates each processed transaction request to a corresponding issuer. The processing circuitry 202 is configured to execute entity resolution for processing each transaction request.

The memory 204 may include suitable logic, circuitry, interfaces, and/or code, executable by the circuitry, that is configured to store merchant details for processing the transactions. The memory 204 includes a first dataset 210a, a second dataset 210b, and a third dataset 210c. The first dataset 210a is shown to include details of a first entity and the second dataset is shown to include details of a plurality of entities. The first through third datasets 210a-210c are explained in conjunction with FIG. 2B. Examples of the memory 204 may include a random-access memory (RAM), a read-only memory (ROM), a removable storage drive, a hard disk drive (HDD), a flash memory, a solid-state memory, and the like. In another embodiment, the memory 204 may be realized in form of a database server or a cloud storage working in conjunction with the payment network server 106, without departing from the scope of the disclosure.

The transceiver 206 may include suitable logic, circuitry, interfaces, and/or code, executable by the circuitry, for transmitting and receiving data over the communication network 112 using one or more communication network protocols. The transceiver 206 receives various transaction requests and transaction responses from the acquirer server 104 and the issuer server 108, respectively. The transceiver 206 transmits transaction requests and transaction responses to the issuer server 108 and the acquirer server 104, respectively. Examples of the transceiver 206 may include, but are not limited to, an antenna, a radio frequency transceiver, a wireless transceiver, a Bluetooth transceiver, an ethernet port, a universal serial bus (USB) port, or any other device configured to transmit and receive data.

The processing circuitry 202 may include various functional elements such as a graph generator 212a, an embedding generator 212b, a nearest neighbor identification engine 212c, a similarity metric engine 212d, a ranking engine 212e, and a neural network training engine 212f to execute operations for implementing entity resolution. Examples of such operations may include generation of a graph, generation of embeddings from the graph, identification of nearest neighbors for an entity in the graph, determination of similarity metric for the nearest neighbors, ranking the nearest neighbors, and training a neural network for the determination of the similarity metric. The processing circuitry 202 is configured to generate the graph, generate the embeddings, identify the nearest neighbors, and determine the similarity metric by way of the graph generator 212a, the embedding generator 212b, the nearest neighbor identification engine 212c, and the similarity metric engine 212d, respectively. The processing circuitry 202 is further configured to rank the nearest neighbors and train the neural network by way of the ranking engine 212e and the neural network training engine 212f, respectively. It will be apparent to those of skill in the art that the processing circuitry 202 may perform various other operations required for processing transactions without deviating from the scope of the disclosure. The functional elements of the processing circuitry 202 may communicate with each other by way of an event bus 214. The functions of the processing circuitry 202 are explained in detail in conjunction with FIGS. 3A-3F.

The event bus 214 may include suitable logic, circuitry, interfaces, and/or code, executable by the circuitry, that is configured to transmit and receive data using one or more communication network protocols.

Figure 2B:
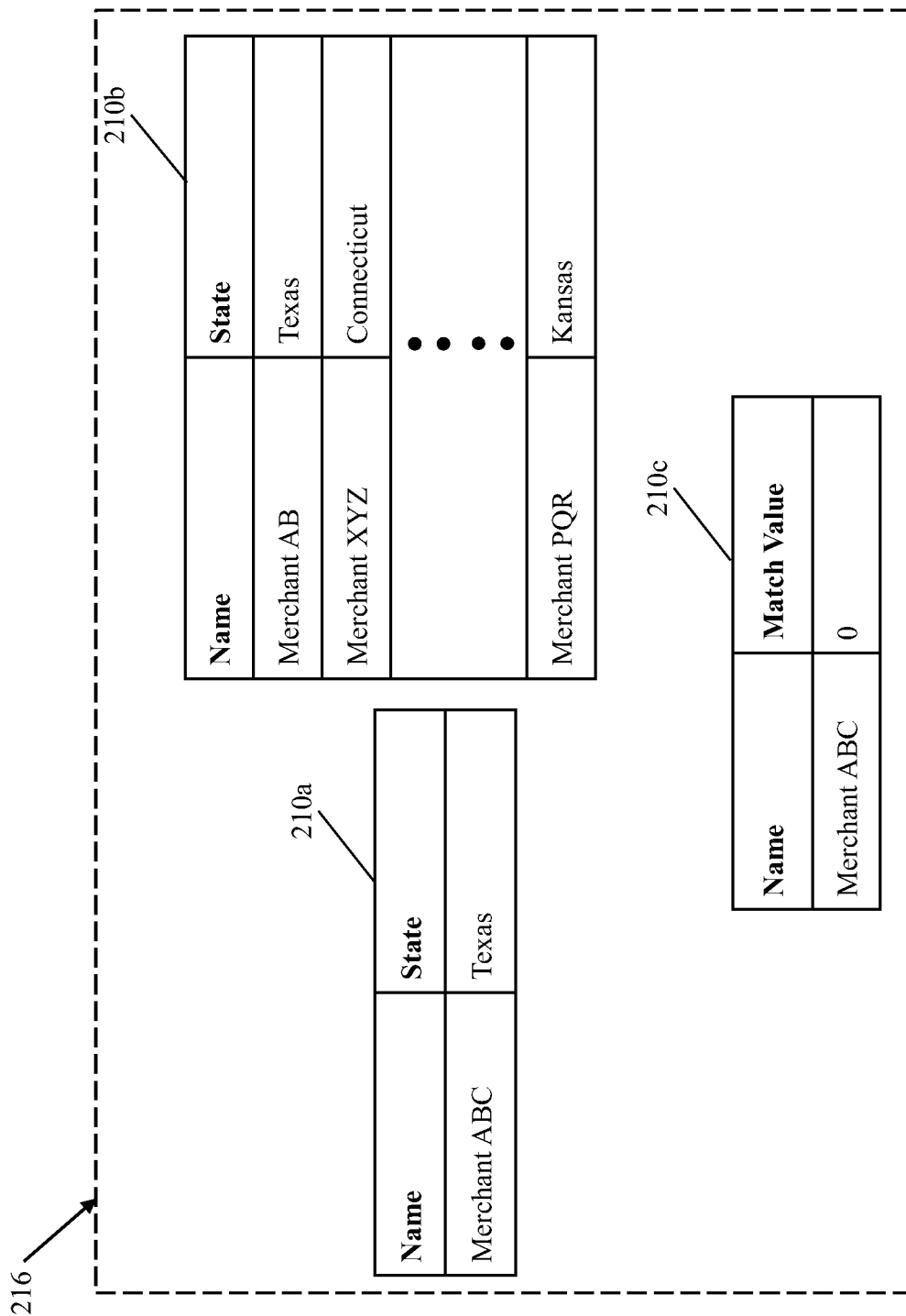
FIG. 2B is a tabular representation that illustrates first through third datasets maintained at the payment network server, in accordance with an exemplary embodiment of the present disclosure.

FIG. 2B is a tabular representation 216 that illustrates the first through third datasets 210a-210c maintained at the payment network server 106, in accordance with an exemplary embodiment of the present disclosure.

The payment network server 106 receives transaction data for processing various transactions. The transaction data includes merchant details of various merchants that are involved in the transactions. The payment network server 106 retrieves the details of the merchants from the transaction data and stores the retrieved merchant details in the first dataset 210a included in the memory 204. As shown in FIG. 2B, the first dataset 210a may be realized in the form of a table having various columns and rows and includes details of the first entity. For illustrative purpose, the first dataset 210a is shown to include merchant details of one merchant (i.e., the first entity). Each row of the first dataset 210a indicates details of a merchant that corresponds to a received transaction request, and the columns of the first dataset 210a indicates name and state of each merchant.

The second dataset 210b includes merchant details of various merchants (i.e., the plurality of entities) who are onboard with the payment network server 106. For example, the second dataset 210b may include the merchant details of those merchants who were involved in one or more historical transactions associated with the payment network server 106. Typically, merchant details of a merchant may include, but are not limited to, a name and an address (e.g. street address, city, and state) of the merchant. For illustrative purpose, the second dataset 210b is shown to include merchant details of three or more merchants (i.e., the plurality of entities). Each row of the second dataset 210b indicates details of each merchant, and the columns of the second dataset 210b indicate name and state of each merchant.

In order to process the transactions, the payment network server 106 initially verifies similarity between the merchant details of the first dataset 210a and the second dataset 210b. The third dataset 210c provides information whether the second dataset 210b includes a match for each merchant in the first dataset 210a. For illustrative purpose, the third dataset 210c is shown to be a table that includes rows and columns. Each row of the third dataset 210c is associated with a merchant of the first dataset 210a. The columns of the third dataset 210c indicate a name of the corresponding merchant and a match value for the corresponding merchant. The match value is indicative of whether the second dataset 210b includes a match for the corresponding merchant or not. For example, the match value for the merchant 'Merchant ABC' is '0', indicating that no match was found in the second dataset 210b for the merchant 'Merchant ABC'. Similarly, if the match value for a merchant is '1', it indicates that a match was found in the second dataset 210b for the merchant. In a scenario where the match value for a merchant of the first dataset 210a is '0', the payment network server 106 is configured to execute merchant entity resolution using graph embedding for identifying a match for that merchant in the second dataset 210b.

FIGS. 3A-3F, collectively illustrate various operations executed by the payment network server 106 for entity resolution, in accordance with an exemplary embodiment of the present disclosure. The payment network server 106 utilizes graph embedding to execute the entity resolution between the first and second datasets 210a and 210b stored in the memory 204.

Figure 3A:
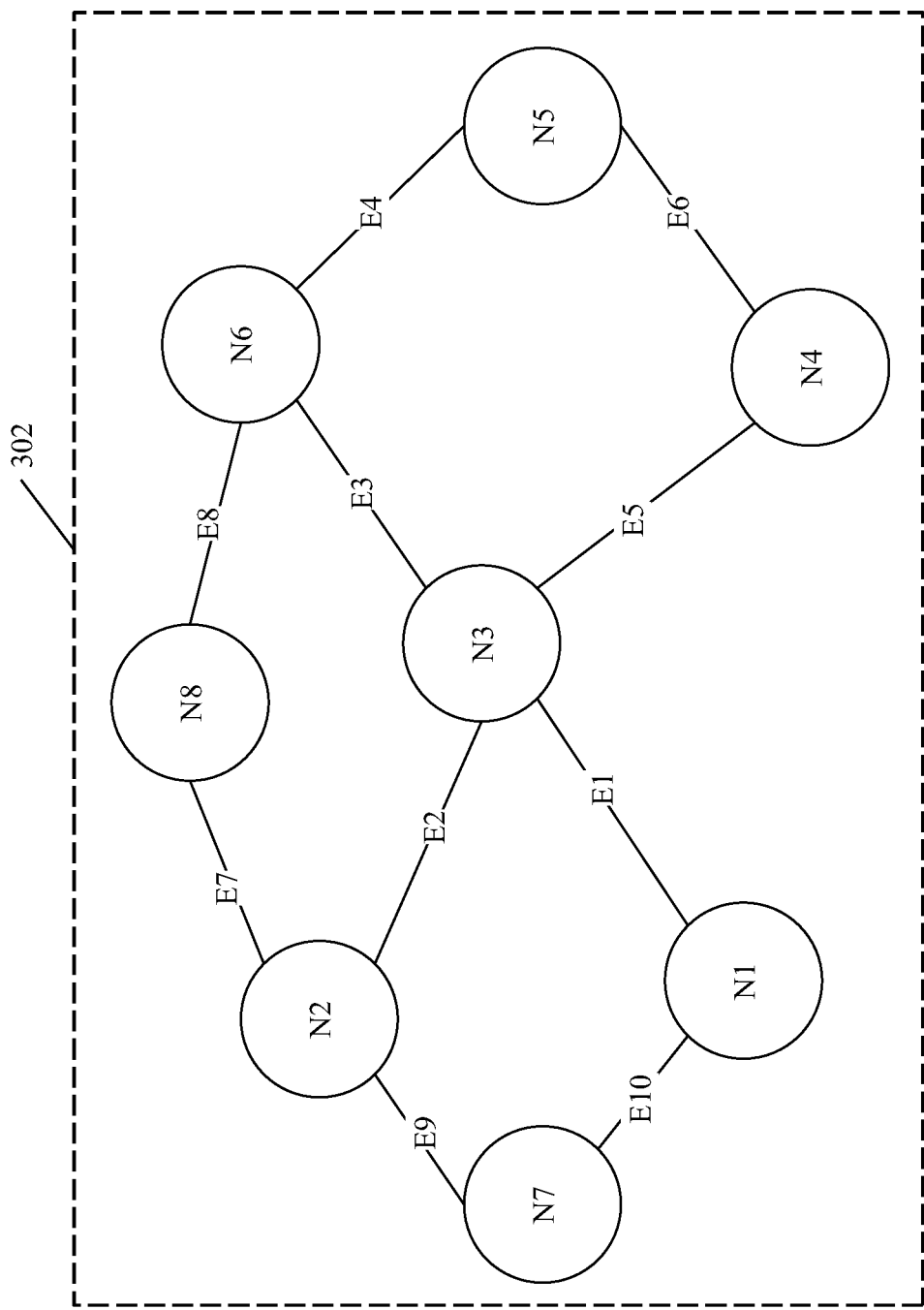

With reference to FIG. 3A, an exemplary graph 302 generated by the graph generator 212a is shown. The graph generator 212a is configured to represent the first and second datasets 210a and 210b stored in the memory 204 as a collection of one or more star graphs. For example, the graph generator 212a represents the first and second datasets 210a-210b in the form of the graph 302 such that a node is assigned to each entity of the first and second datasets 210a-210b and its attribute (e.g., name of merchant and address of the merchant). The graph generator 212a may utilize one or more graph databases known in the art (e.g., Neo4j, Janus Graph, or the like) to generate the graph 302 from the first and second datasets 210a and 210b. For illustrative purpose, the graph 302 is shown to include a plurality of nodes N1-N8 where the nodes N3, N5, N7, and N8 represent the entities and the nodes N1, N2, N4, and N6 represent the attributes of the entities, in the first and second datasets 210a-210b. A node that represents an entity is referred to as an entity node and a node that represents an attribute is referred to as an attribute node.

In the graph 302, the entity nodes (N3, N5, N7, and N8) are linked to their corresponding attribute nodes (N1, N2, N4, N6) by way of edges (E1-E10). In a scenario where an attribute is a multi-token attribute (for example, address of an entity including a street name, a state name and a country name), the graph generator 212a assigns a separate node to each unique token in the address. In such a scenario, the entity node corresponding to the multi-token attribute is linked to the nodes assigned to the unique tokens. In essence, data of the first and second datasets 210a-201b is represented as a collection of star graphs by the graph generator 212a where nodes assigned to the entities are centers of local star graphs. Here, the entity node N3 refers to the first entity (e.g., Merchant ABC) of the first dataset 210a. The entity nodes N5, N7, and N8 refer to the plurality of entities (e.g., 'Merchant AB', 'Merchant PQR', and 'Merchant XYZ') of the second dataset 210b. The generation of the graph 302 is followed by generation of embeddings by the embedding generator 212b (as shown in FIG. 3B).

Figure 3B:
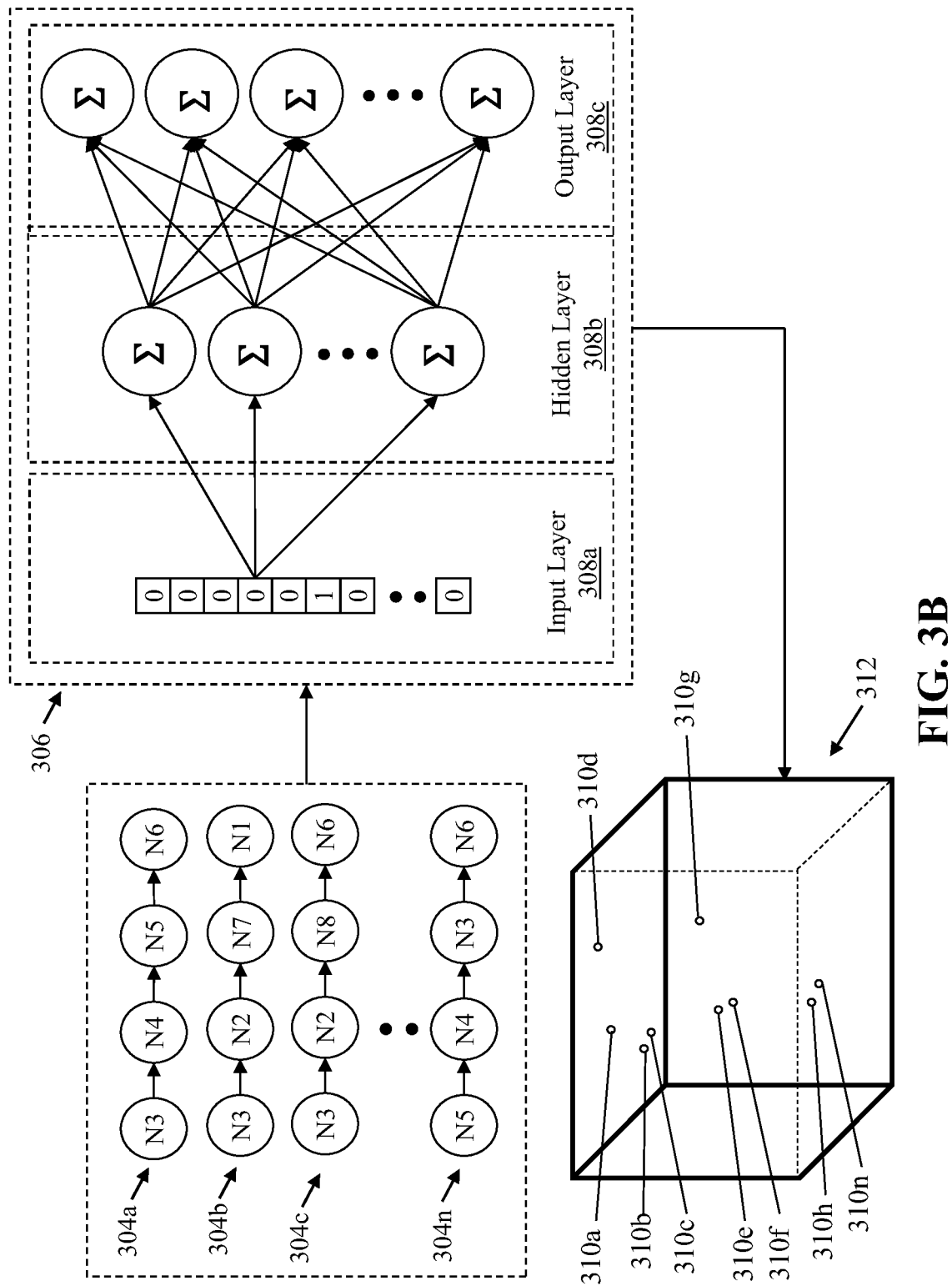

With reference to FIG. 3B, various operations performed by the embedding generator 212b for the generation of embeddings are shown. Graph embedding is an approach that is used to transform nodes and edges of a graph into a vector space (a lower dimension) whilst maximally preserving graph properties, such as graph structure and information. The graph embedding may be performed on a node level, a sub-graph level, or the like. Examples of various techniques used to execute graph embedding may include DeepWalk, Node2vec, Graph2vec, Structural Deep Network embedding, or the like. The embedding generator 212b may use one or more of these techniques to execute graph embedding, without deviating from the scope of the disclosure. For the sake of ongoing description, it is assumed that the embedding generator 212b utilizes DeepWalk technique for generating embeddings for the graph 302. In DeepWalk, a node's information is encoded by collecting a set of random walks originating from that node. A random walk originates from a selected node and advances to a random neighbor from a current node for a defined number of steps.

As a first step to execute DeepWalk technique, the embedding generator 212b samples the graph 302 with a set of random walks 304a-304n. Each random walk 304a-304n originates from a node (e.g., the nodes N3 and N5) of the graph 302 and has, for example, four steps. Similarly, the embedding generator 212b obtains other random walks originating from other nodes (N1-N2, N4, and N6-N8) of the graph 302. It will be apparent to a person of ordinary skill in the art that the embedding generator 212b may obtain as many random walks as required for its operation.

As a second step to execute DeepWalk technique, the embedding generator 212b trains a skip-gram neural network 306 to generate embeddings for each node N1-N8 of the graph 302. The skip-gram neural network 306 includes an input layer 308a, a hidden layer 308b, and an output layer 308c. The skip-gram neural network 306 accepts, at the input layer 308a, latent representations of a node from a random walk (e.g., the set of random walks 304a-304n) as a one-hot encoding and maximizes the probability for predicting neighbor nodes for the input. For example, the one-hot encoding is a binary vector (e.g., a column matrix or a row matrix) with length same as that of number of nodes in the graph 302. Typically, elements of the one-hot encoding are all zeros except one element. The one element may be "1", which is in the place where an encoded node appears in a graph dictionary (i.e., a list of nodes) of the graph 302. For example, if the entity node N3 is at a third position in the graph dictionary that lists 20 nodes, the one-hot encoding for the entity node N3 is a row matrix with 20 columns having all zeroes except at third element, which includes "1".

The hidden layer 308b has no activation function, and outputs an embedding of the node for which the one-hot vector is provided to the input layer 308a. The output layer 308c has a SoftMax regression classifier that predicts neighborhood nodes of the input node. The output of the output layer 308c is also a one-hot encoding representing an output entity node. The training of the skip-gram neural network 306 is a well-known method in the art, and so its detailed description is omitted for sake of brevity. Mainly, the skip-gram neural network 306 is trained to learn weights of the hidden layer 308b.

As a third step to execute DeepWalk technique, the embedding generator 212b is configured to generate embeddings 310a-310n for various entity nodes (e.g., N3, N5, N7, and N8) in the graph 302 using the trained skip-gram neural network 306. Embedding for a node is generated based on the output of hidden layer 308b of the trained skip-gram neural network 306, as shown by equation (1) below:

$$[0\ 0\ 1\ 0\ 0\ 0\ 0\ 0] \times \begin{bmatrix} -0.1 & 0.8 & 0.7 \\ 0.3 & 0.5 & 0.7 \\ 0.5 & 0.6 & -0.1 \\ 0.1 & 0.4 & 0 \\ 0.4 & -0.7 & 0.3 \\ 0.8 & 0.4 & 0.2 \\ 0.2 & 0.4 & 0.8 \\ -0.1 & 0.8 & 0.5 \end{bmatrix} = [0.5\ 0.6\ -0.1] \quad (1)$$

where,

[0 0 1 0 0 0 0 0] is one-hot vector for the entity node N3 provided as input to the input layer 308a of the trained skip-gram neural network 306, $$\begin{bmatrix} -0.1 & 0.8 & 0.7 \\ 0.3 & 0.5 & 0.7 \\ 0.5 & 0.6 & -0.1 \\ 0.1 & 0.4 & 0 \\ 0.4 & -0.7 & 0.3 \\ 0.8 & 0.4 & 0.2 \\ 0.2 & 0.4 & 0.8 \\ -0.1 & 0.8 & 0.5 \end{bmatrix}$$

is a weight matrix of the hidden layer 308b with rows (one for every node in the graph) and columns (one for every hidden neuron) obtained from the trained skip-gram neural network 306, and

[0.5 0.6 −0.1] is exemplary embedding generated for the entity node N3.

Similarly, the embedding generator 212b generates the embeddings 310a-310n for the other entity nodes in the graph 302. The embeddings 310a-310n may be represented in a d-dimensional embedding space 312, where d denotes any suitable number of dimensions. For illustrative purpose, the d-dimensional embedding space 312 is shown as a three-dimensional embedding space 312 that includes various points representing the embeddings 310a-310n generated by the embedding generator 212b. Each embedding 310a-310n may include coordinates corresponding to a particular point in the embedding space 312.

With reference to FIG. 3C, for the sake of brevity, an embedding generated by the payment network server 106 is illustrated as a table that has one row and multiple columns. In FIG. 3C, the embeddings 310a-310n of the entity nodes (N3, N5, N7, N8, . . . , Nn) are illustrated as tables, each having one row with 8 columns. Here, each cell of the row indicates a representation of the entity node in the d-dimensional embedding space 312. Here, the entity node N3 refers to the first entity of the first dataset 210a. The entity nodes (N5, N7, N8, . . . , Nn) refer to the plurality of entities of the second dataset 210b. Therefore, the embedding 310b is of the first entity, and the embeddings 310d-310n are of the plurality of entities.

With reference to FIG. 3D, the identification of nearest neighbors by the nearest neighbor identification engine 212c is shown. The nearest neighbor identification engine 212c performs the identification of the nearest neighbors as a blocking technique to reduce the number of overall record comparisons that need to be made for entity resolution. The nearest neighbor identification engine 212c may utilize one or more nearest neighbor identification techniques known in the art to identify the nearest neighbors of an entity in the graph 302. Examples of such nearest neighbor identification techniques may include ANNOY (Approximate Nearest Neighbors Oh Yeah), Locality-Sensing Hashing (LSH), or the like.

For the sake of ongoing description, it is assumed that the nearest neighbor identification engine 212c utilizes ANNOY technique to identify N nearest neighbors for an embedding of an entity node in the graph 302. ANNOY technique is an approximate similarity matching technique that enables the nearest neighbor identification engine 212c to optimize a real-time search to identify N nearest neighbors with a low-latency response. For identifying N nearest neighbors of an entity of the graph 302, the nearest neighbor identification engine 212c utilizes the embeddings 310a-310n generated by the embedding generator 212b. Based on ANNOY technique, the nearest neighbor identification engine 212c defines as a proximity measure for a pair of embeddings. The proximity measure may be cosine similarity or Euclidean distance. The nearest neighbor identification engine 212c using ANNOY returns top N nearest neighbors (N nearest matching entities) to the first entity of the first dataset 210a. By using ANNOY, a limit can be set on number of nearest matching entities. The expected complexity time for execution of ANNOY is O(log(n)), where n is the number of embeddings that are used. The nearest neighbor identification engine 212c using ANNOY allows search for nearest matching N embeddings (entity represented through these embeddings) of the first entity in O(log n) time complexity.

The nearest neighbor identification engine 212c utilizes the generated embeddings 310a-310n to identify, for the first entity ('N3') in the first dataset 210a, a set of nearest neighbors 314. The set of nearest neighbors 314 correspond to the plurality of entities from the second dataset 210b for which the embeddings are identified to be similar to the embedding 310b of the first entity ('N3'). Upon the identification of the set of nearest neighbors 314, the payment network server 106 utilizes the similarity metric engine 212d to rank the set of nearest neighbors 314 as shown in FIGS. 3E-3F.

It will be apparent to a person of ordinary skill in the art that the set of nearest neighbors 314 is shown for illustrative purpose. In actual implementation, the set of nearest neighbors 314 may include any number of nearest neighbors depending upon availability of computational resources and processing time criteria of the payment network server 106, without deviating from the scope of disclosure.

Figure 3E:
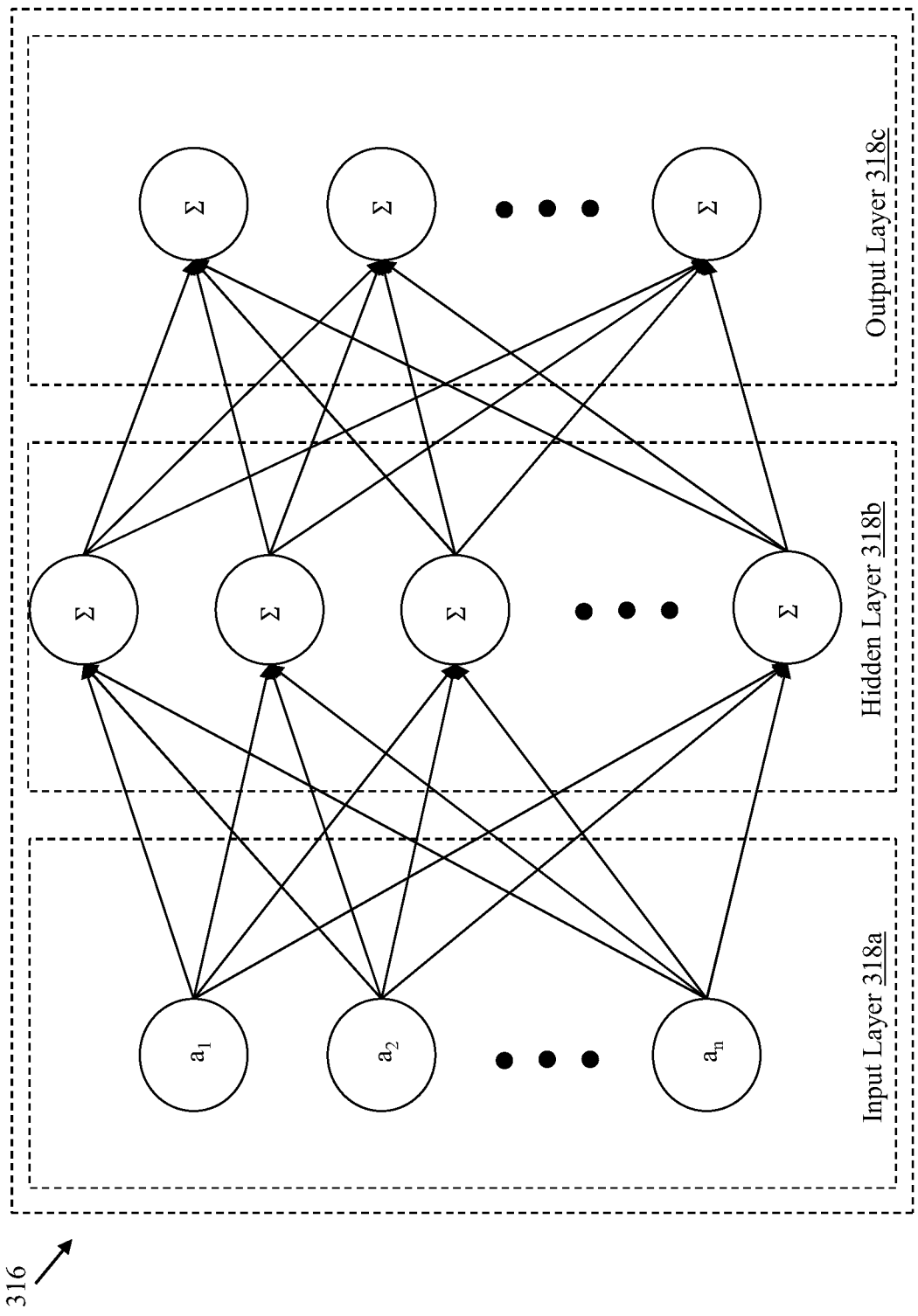

With reference to FIGS. 3E-3F, determination of the similarity metric by the similarity metric engine 212d is shown. Upon the identification of the set of nearest neighbors 314, the similarity metric engine 212d determines a similarity metric with respect to the embedding 310b of the first entity ('N3') for the embeddings 310d, 310e, and 310h of each of the identified nearest neighbor in the set of nearest neighbors 314. The similarity metric is value for the degree of similarity between the first entity ('N3') and each of the set of nearest neighbors 314 (e.g., 'N5', 'N7', and 'N8'). Prior to determining the similarity metric, an artificial neural network 316 is trained by the neural network training engine 212f using a triplet loss function, for determining the similarity metric. Hereinafter, the terms "the artificial neural network 316" and "the neural network 316" are used interchangeably.

The triplet loss function is a distance-based loss function that operates on three inputs: anchor (a) which is any arbitrary data point; positive (p) which is the same class as the anchor; and negative (n) which is a different class from the anchor. Mathematically, the triplet loss function is defined by equation (2) as shown below:

$$\mathcal{L} = \max(d(a,p) - d(a,n) + \text{margin}, 0) \quad (2)$$

where,
"a" represents the anchor entity that is to be searched,
"p" represents the positive entity that is similar to the anchor entity, and
"n" represents a negative entity that does not match the anchor entity.

The triplet loss function is a loss function for a neural network where the anchor entity is compared to the positive entity and the negative entity. The distance from the anchor entity to the positive entity is minimized, and the distance from the anchor entity to the negative entity is maximized. The loss can be minimized by pushing d(a,p) to 0 and d(a,n) to be greater than d(a,p)+margin. Thus, after the training the neural network, the positive entity becomes closer to the anchor entity while the negative entity becomes farther from the anchor entity. Margin defines how far away the dissimilarities should be, i.e., if margin=0.2 and d(a,p)=0.5 then d(a,n) should at least be equal to 0.7.

The neural network training engine 212f trains the neural network 316. Examples of the neural network 316 may include a convolution neural network (CNN), a deep neural network (DNN), a recurrent neural network (RNN) such as Long Short Term Memory networks (LSTM) networks, or an artificial neural network that may be a combination of the RNN and CNN networks. The neural network training engine 212f may employ machine learning algorithms, such as supervised, unsupervised, semi-supervised, or reinforcement machine learning algorithms for training the neural network 316. Typically, the machine learning algorithms refer to a category of algorithms employed by a system that allows the system to become more accurate in predicting outcomes and/or performing tasks, without being explicitly programmed.

For training the proposed neural network 316, an anchor entity (a1) and random samples of positive and negative entities (a2-an) are used to determine a loss function of the neural network 316. The neural network 316 includes an input layer 318a, a hidden layer 318b, and an output layer 318c. The neural network training engine 212f inputs the anchor entity (a1) and random samples of positive and negative entities (a2-an) to the neural network 316 at the input layer 318a. The neural network training engine 212f trains the neural network 316 to learn the relationships defined by the inputs of the input layer 318a. The output feature vectors from the hidden layer 318b are provided to the output layer 318c. In one example, the output layer 318c employs a SoftMax classifier to identify when feature vectors of two entities are located beyond a threshold distance from each other when mapped in feature space. The triplet loss function determines the minimal distances between the inputs used to train the neural network 316 and determines the value of margin. The neural network training engine 212f finishes training when the error of the triplet loss function is at a minimum. The training of an artificial neural network using triplet loss function is a well-known method in the art, and so its detailed description is omitted for sake of brevity.

Based on the value of margin, the triplet loss function (as defined in the equation 2) and the trained neural network 316 is used by the similarity metric engine 212d to determine the similarity metric for each of the identified nearest neighbor (e.g., 'N5', 'N7', and 'N8') in the set of nearest neighbors 314. Further, for identifying the most similar neighbors and the most dissimilar neighbors in the set of nearest neighbors 314, the ranking engine 212e ranks the nearest neighbors in a descending order based on the values of the determined similarity metric.

With reference to FIG. 3F, a comparison table 320 is shown which lists the ranked identified nearest neighbors (e.g., 'Merchant AB', 'Marchant PQR', and 'Merchant XYZ') in a descending order of the similarity with the first entity ('Merchant ABC'). Similarity metric column in the comparison table 320 indicates the value of the similarity metric obtained for each of the identified nearest neighbor (e.g., 'Merchant AB', 'Marchant PQR', and 'Merchant XYZ') with respect to the first entity ('Merchant ABC'). The ranking engine 212e further associates the merchant entity ('Merchant ABC') with a second entity ('Merchant AB') of the second dataset 210b that corresponds to the nearest neighbor having the highest value for the similarity metric, to process the transaction corresponding to the first entity ('Merchant ABC'). For associating the first entity ('Merchant ABC') with the second entity ('Merchant AB'), the ranking engine 212e may update the second dataset 210b and include an additional column for the merchant entity (i.e., 'Merchant AB') to indicate the other name (i.e., 'Merchant ABC') of the merchant entity ('Merchant AB').

The payment network server 106 further updates the third dataset 210c to indicate that a match is obtained in the second dataset 210b for the first entity ('Merchant ABC'). The updated second dataset 210b and the updated third dataset 210c allow the payment network server 106 to easily identify a match in the second dataset 212b for the first entity ('Merchant ABC') in future transactions without the step of entity resolution. Thus, once the payment network server 106 performs entity resolution for an entity in the first dataset 210a, the payment network server 106 is not required to perform entity resolution for the same entity in any future transaction. In addition, once the graph 302 is generated by the payment network server 106, the payment network server 106 is only required to modify the graph for inclusion of new entities.

In another embodiment, the value of the similarity metric for each of the identified nearest neighbor of the first entity may be less than a threshold value. In such a scenario, the payment network server 106 establishes that the first entity corresponds to a new merchant that has not been onboarded with the payment network server 106. In such a scenario, the payment network server 106 is configured to update the second dataset 210b and include a new row to add the details of new entity (i.e., the first entity). Thus, by performing entity resolution the payment network server 106 is capable of identifying new merchant entities for record maintenance.

Figure 4:
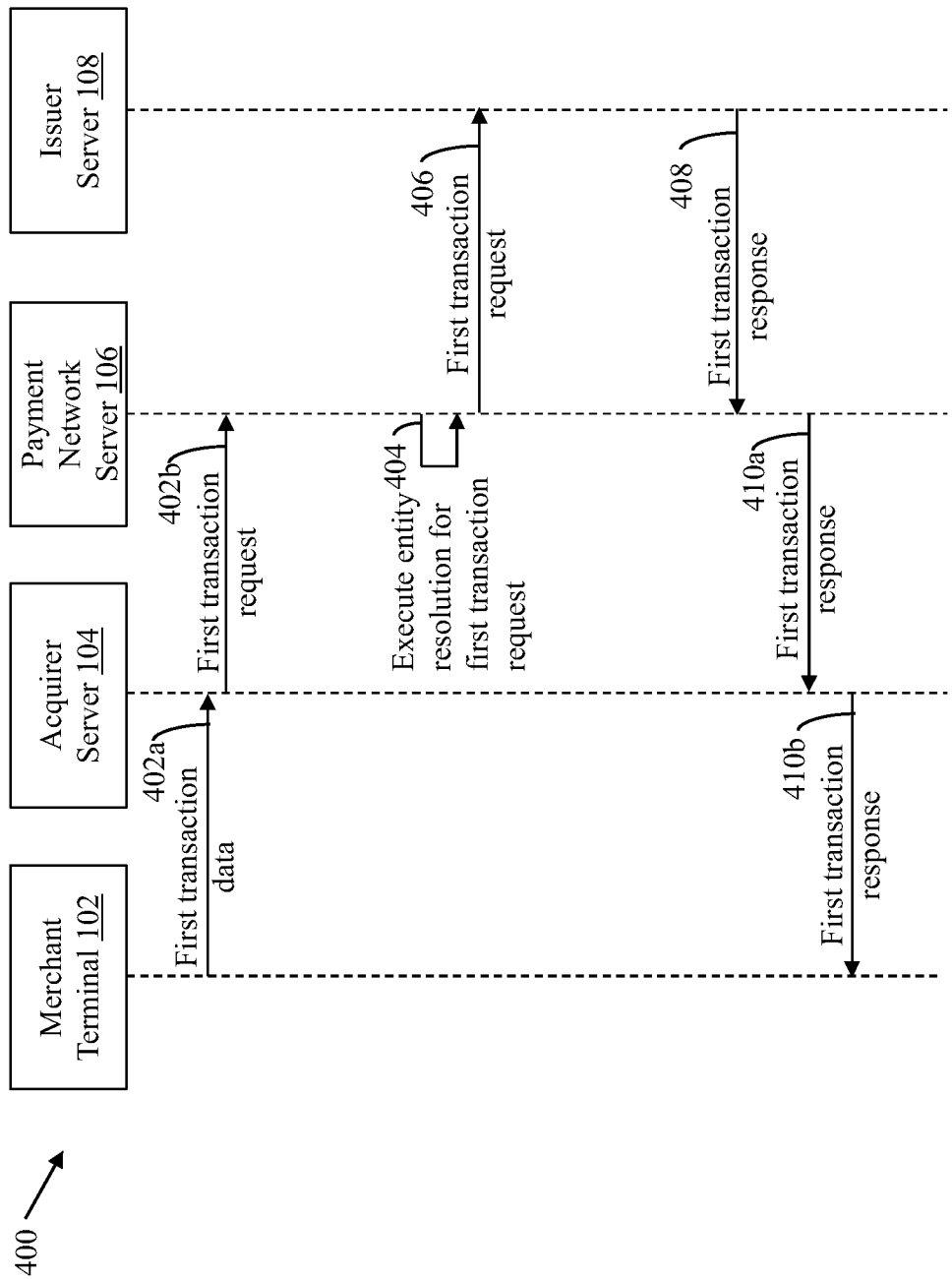
FIG. 4 represents a process flow diagram that illustrates processing of a first transaction by the payment network server, in accordance with an exemplary embodiment of the present disclosure.

FIG. 4 represents a process flow diagram 400 that illustrates processing of a first transaction by the payment network server 106, in accordance with an exemplary embodiment of the present disclosure. The process flow diagram 400 involves the merchant terminal 102, the acquirer server 104, the payment network server 106, and the issuer server 108.

The merchant terminal 102 communicates first transaction data of the first transaction to the acquirer server 104 (as shown by arrow 402a). The first transaction data is indicative of a first transaction amount of the first transaction, payment details of a payment mode used for initiating the first transaction, merchant details (e.g., name, address, city, and state of merchant) of the merchant, or the like. Based on the first transaction data, the acquirer server 104 communicates a first transaction request to the payment network server 106 (as shown by arrow 402b). The first transaction request includes the first transaction data.

The payment network server 106 receives the first transaction request from the acquirer server 104. Reception of the first transaction request may cause the payment network server 106 to execute entity resolution. Thus, the payment network server 106 executes entity resolution for the first transaction (as shown by arrow 404). Execution of entity resolution for the first transaction is described in conjunction with FIGS. 3A-3F and FIGS. 5A-5F.

After execution of the entity resolution, the payment network server 106 processes the first transaction request and communicates the processed first transaction request to the issuer server 108 for authorization of the first transaction (as shown by arrow 406). Based on the first transaction request, the issuer server 108 authorizes the first transaction and communicates a first transaction response to the payment network server 106 (as shown by arrow 408). The first transaction response indicates whether the first transaction is approved or declined by the issuer server 108. The payment network server 106 further communicates the first transaction response to the merchant terminal 102 by way of the acquirer server 104 (as shown by arrows 410a and 410b).

It will be apparent to a person of ordinary skill in the art that the scope of the disclosure is not limited to executing the entity resolution functionality by the payment network server 106. In another embodiment, the acquirer server 104, the issuer server 108, or any third-party server (not shown) may be equipped with the entity resolution functionality, without deviating from the scope of the disclosure. In such a scenario, the acquirer server 104, the issuer server 108, and/or the third-party server may execute the entity resolution functionality in a similar manner as described for the payment network server 106 in conjunction with FIGS. 3A-3F and 5A-5F.

FIGS. 5A-5F, collectively represent an exemplary scenario 500 that illustrates merchant entity resolution implemented by the payment network server 106 for processing the first transaction, in accordance with an exemplary embodiment of the present disclosure.

With reference to FIG. 5A, a stored dataset 502 included in the memory 204 of the payment network server 106 is shown. In one example, the stored dataset 502 may be realized in the form of a table having various rows and columns. The stored dataset 502 includes merchant details of various merchants who are onboard with the payment network server 106. For illustrative purpose, the stored dataset 502 is shown to include merchant details of three merchants. Each row of the stored dataset 502 indicates details of each merchant, and the columns of the stored dataset 502 indicate name, street address, city, and state of each merchant. The stored dataset 502 is same as the second dataset 210b shown in FIGS. 2A and 2B.

The payment network server 106 receives transaction requests (e.g., the first transaction request) for processing various transactions (e.g., the first transaction). Each transaction request includes merchant details of a corresponding merchant that is involved in the transaction. The payment network server 106 retrieves the details of the merchants from the transaction requests and stores the retrieved merchant details in a transaction dataset 504 included in the memory 204. In one example, the transaction dataset 504 may be realized in the form of a table having various columns and rows. For illustrative purpose, the transaction dataset 504 is shown to include merchant details of three merchants. Each row of the transaction dataset 504 indicates details of each merchant, and the columns of the transaction dataset 504 indicate name, street address, city, and state of each merchant. The merchant ('Domino's 134') is associated with the first transaction. The transaction dataset 504 is same as the first dataset 210a as shown in FIGS. 2A and 2B.

In order to process the transactions, the payment network server 106 initially verifies similarity between the merchant details of the transaction dataset 504 and the stored dataset 502. The payment network server 106 includes a linking dataset 506 that provides information whether the stored dataset 502 includes a match for each merchant in the transaction dataset 504. For illustrative purpose, the linking dataset 506 is shown to be a table that includes rows and columns. Each row of the linking dataset 506 is associated with a merchant of the transaction dataset 504. The columns of the linking dataset 506 indicates a name of the corresponding merchant and a match value for the corresponding merchant. The match value is indicative of whether the stored dataset 502 includes a match for the corresponding merchant or not. For example, the match value for the merchant '134 Domino's' is '0', indicating that no match was found in the stored dataset 502 for the merchant '134 Domino's'. Similarly, the match value for the merchant '111 Walmart' is '1', indicating that a match was found in the stored dataset 502 for the merchant '111 Walmart'. In a scenario where the match value for a merchant of the transaction dataset 504 is '0', the payment network server 106 is configured to execute merchant entity resolution using graph embedding for identifying a match for that merchant in the stored dataset 502. FIGS. 5B-5E illustrate various exemplary operations performed by the payment network server 106 to execute the merchant entity resolution for the merchant 'Dominos 134' in the transaction dataset 504.

Figure 5B:
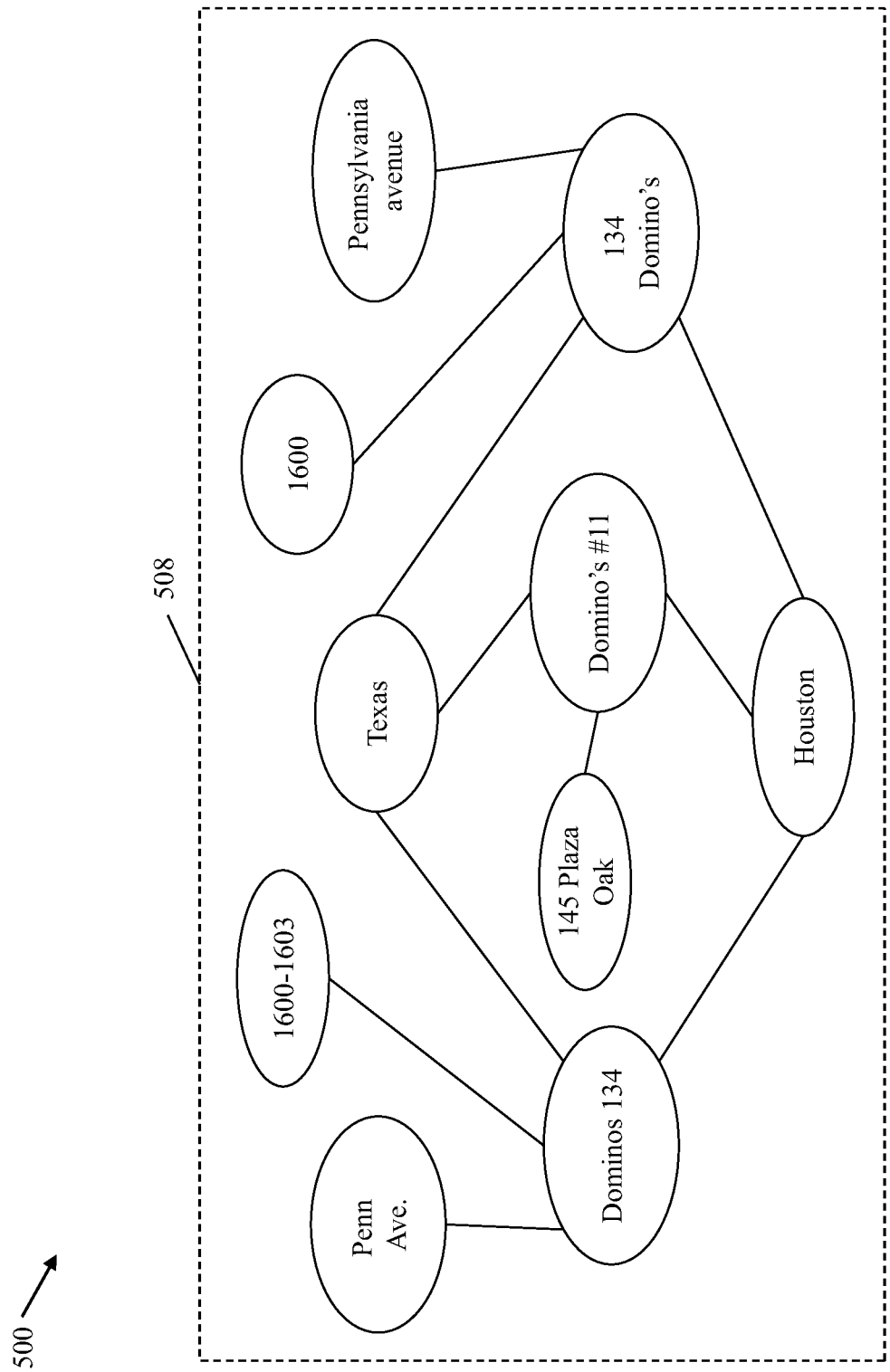

With reference to FIG. 5B, the payment network server 106 represents both the transaction dataset 502 and the stored dataset 504 as a single graph. For example, as shown in FIG. 5B, the payment network server 106 generates a graph 508 to represent the stored dataset 502 and the transaction dataset 504. The graph 508 includes various entity nodes that are assigned to merchants (also referred to as merchant entities) in the stored and transaction datasets 502 and 504. The graph 508 further includes various attribute nodes assigned to the attributes of the corresponding merchant entities. An entity node of a merchant entity is linked to attribute nodes assigned to the attributes of that merchant entity by way of edges. For example, as per the transaction dataset 504, a merchant entity 'Dominos 134' has 'Texas' as a state attribute. Thus, the graph 508 includes an entity node, corresponding to the merchant entity 'Dominos 134', which is linked to an attribute node representing the state attribute 'Texas'. Further, as per the stored dataset 502, a merchant entity ('134 Domino's') has '1600 Pennsylvania Avenue' as a street attribute. Similarly, the graph 508 includes an entity node corresponding to the merchant entity '134 Domino's'. Since the street attribute of the merchant entity '134 Domino's' is multi-token attribute, the entity node corresponding to the merchant entity '134 Domino's' is linked to two attribute nodes representing the two tokens ('1600' and 'Pennsylvania Avenue') of the street attribute. The payment network server 106 generates the graph 508 in a similar manner as described for the graph 302 in FIG. 3A.

It will be apparent to a person of ordinary skill in the art that the graph 508 is shown for exemplary purpose and should not be construed to limit the scope of the disclosure. In actual implementation, volume and complexity of the stored dataset 502 and the transaction dataset 504 may be much larger and the actual graph generated by the payment network server 106 may be more complex in terms of number of nodes and interconnections between the nodes.

Figure 5C:
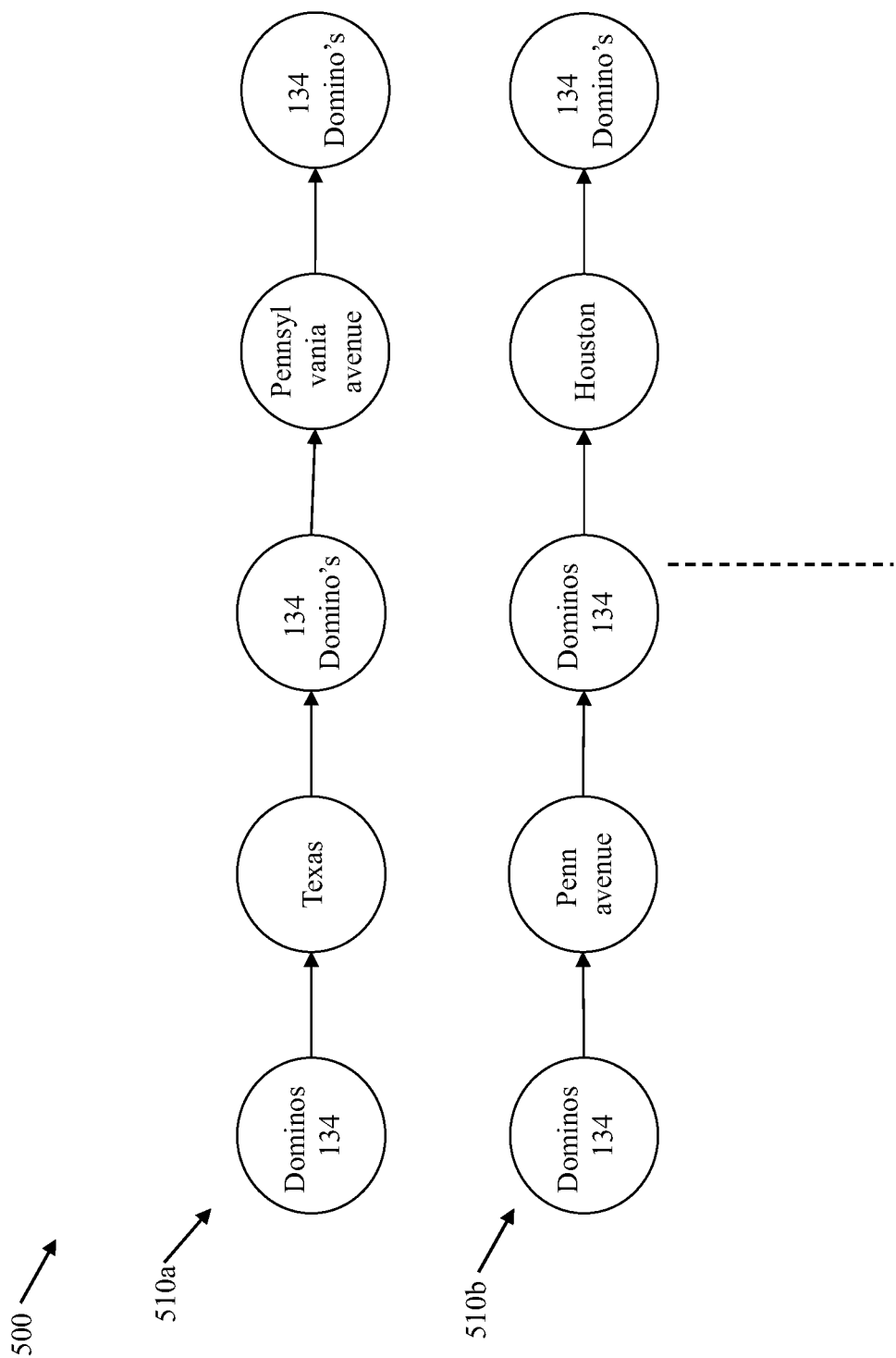

With reference to FIG. 5C, upon generating the graph 508, the payment network server 106 generates various random walks originating from each node of the graph 508. For illustrative purpose, two random walks 510a and 510b generated by the payment network server 106 are shown in FIG. 5C. The random walks 510a and 510b have originated from the entity node 'Dominos 134' and the length of the random walks 510a and 510b is 'five'.

With reference to FIG. 5D, the payment network server 106 uses the generated random walks (for example, the random walks 510a and 510b) as input to the skip-gram neural network 306 and generates embeddings 512a-512n for each node of the graph 508. The generation of embeddings 512a-512n by using the skip-gram neural network 306 by the payment network server 106 is explained in detail in conjunction with FIG. 3B. An embedding of a node represents the node as a point in an n-dimensional embedding space, for example, 8-dimensional embedding space.

Figure 5E:
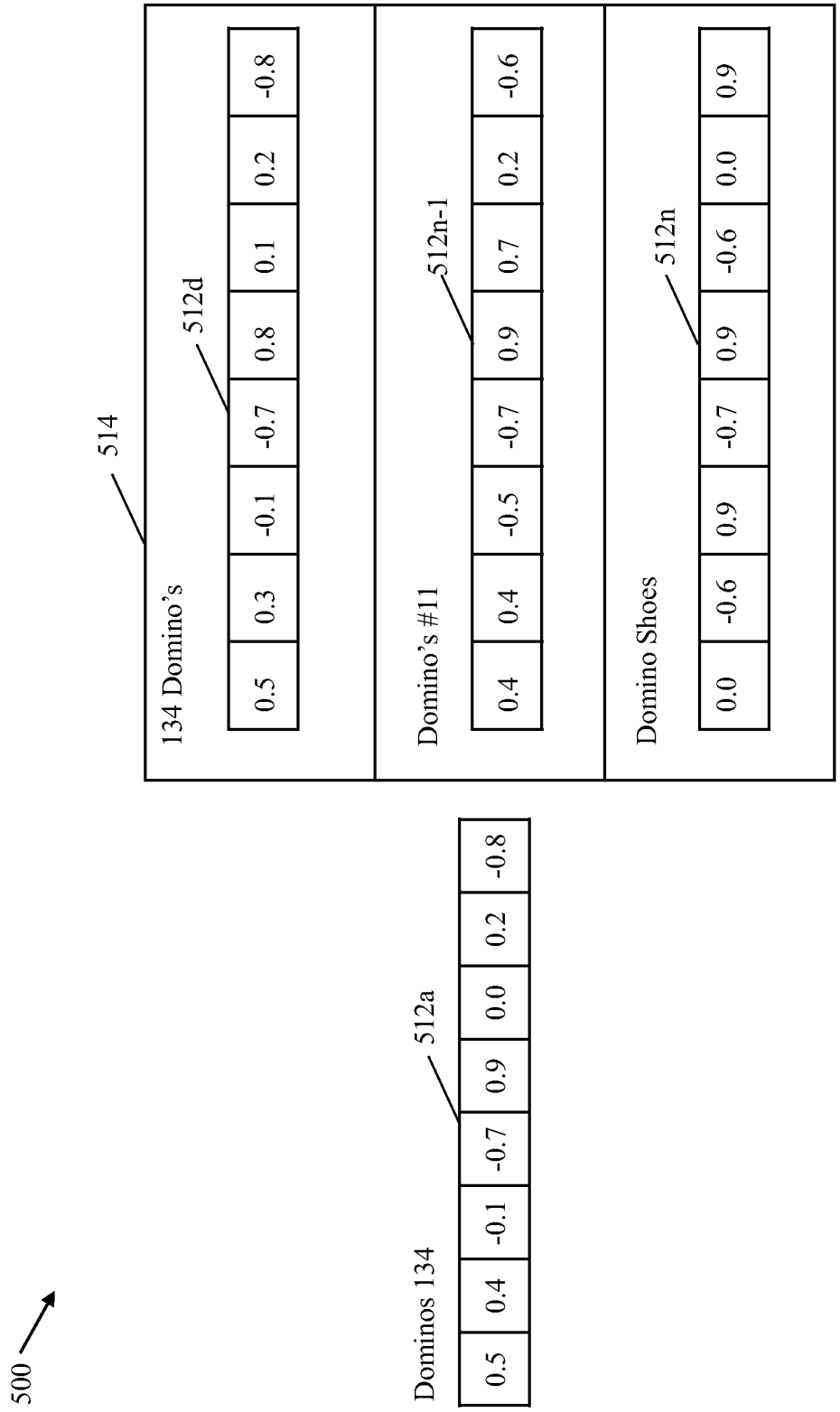

With reference to FIG. 5E, the payment network server 106 utilizes the generated embeddings 512a-512n to identify, for the merchant entity ('Dominos 134') in the transaction dataset 504, a set of nearest neighbors 514. The set of nearest neighbors 514 correspond to those merchant entities from the stored dataset 502 for which the embeddings are identified to be similar to the embedding 512a of the merchant entity ('Dominos 134'). For identifying the set of nearest neighbors 514, the payment network server 106 uses the generated embeddings 512a-512n as input to the ANNOY algorithm as explained in detail in conjunction with FIG. 3D. In a non-limiting example, it is assumed that the payment network server 106 identifies three merchant entities '134 Domino's', 'Domino's #11', and 'Domino Shoes' to form the set of nearest neighbors 514.

With reference to FIG. 5F, upon the identification of the set of nearest neighbors 514, the payment network server 106 determines a similarity metric with respect to the merchant entity ('Dominos 134') for the embeddings 512d, 512n-1, and 512n of each of the identified nearest neighbor in the set of nearest neighbors 514. The payment network server 106 uses the trained artificial neural network 316 to determine the similarity metric for the embeddings 512d, 512n-1, and 512n of each of the identified nearest neighbor in the set of nearest neighbors 514. In one example, the payment network server 106 may use a triplet loss function for training the neural network 316. The training of the neural network 316 using the triplet loss function technique is explained in conjunction with FIG. 3E. The similarity metric is value for the degree of similarity between the merchant entity ('Dominos 134') and each of the set of nearest neighbors 514 (e.g., '134 Domino's', 'Domino's #11', and 'Domino shoes'). Further, for identifying the most similar neighbors and the most dissimilar neighbors, the payment network server 106 ranks the nearest neighbors in the set of nearest neighbors 514 in a descending order based on the values of the determined similarity metric. In FIG. 5F, a comparison table 516 is shown which lists the identified nearest neighbors (e.g., '134 Domino's', 'Domino's #11', and 'Domino shoes') in a descending order of the similarity with the merchant entity ('Dominos 134'). Similarity metric column in the comparison table 516 indicates the value of the similarity metric obtained for each of the identified nearest neighbor (e.g., '134 Domino's', 'Domino's #11', and 'Domino shoes') with respect to the merchant entity ('Dominos 134'). The payment network server 106 further associates the merchant entity ('Dominos 134') with a merchant entity ('134 Domino's') of the stored dataset 502 that corresponds to the nearest neighbor having the highest value for the similarity metric, to process the transaction corresponding to the merchant ('Dominos 134'). For associating the merchant entity ('Dominos 134') with the merchant entity ('134 Domino's'), the payment network server 106 may update the stored dataset 502 and include an additional column for the merchant entity (i.e., '134 Domino's') to indicate another name (i.e., 'Domino's 134') of the merchant entity ('134 Domino's').

The payment network server 106 further updates the linking dataset 506 to indicate that a match is obtained in the stored dataset 502 for the merchant ('Dominos 134'). The updated stored dataset 502 and the updated linking dataset 506 allows the payment network server 106 to easily identify a match in the stored dataset 502 for the merchant entity ('Dominos 134') in future transactions without the step of entity resolution. Thus, once the payment network server 106 performs entity resolution for a merchant entity in the transaction dataset 504, the payment network server 106 is not required to perform entity resolution for the same merchant entity in any future transaction.

In another embodiment, the value of the similarity metric for each of the identified nearest neighbor of the merchant entity ('Domino's 134') may be less than the threshold value. In such a scenario, the payment network server 106 establishes that the merchant entity ('Domino's 134') corresponds to a new merchant that has not been onboarded with the payment network server 106. In such a scenario, the payment network server 106 is configured to update the stored dataset 502 and include a new row to add the details of the new merchant entity ('Domino's 134'). Thus, by performing entity resolution the payment network server 106 is capable of identifying new merchant entities for record maintenance.

Figure 6:
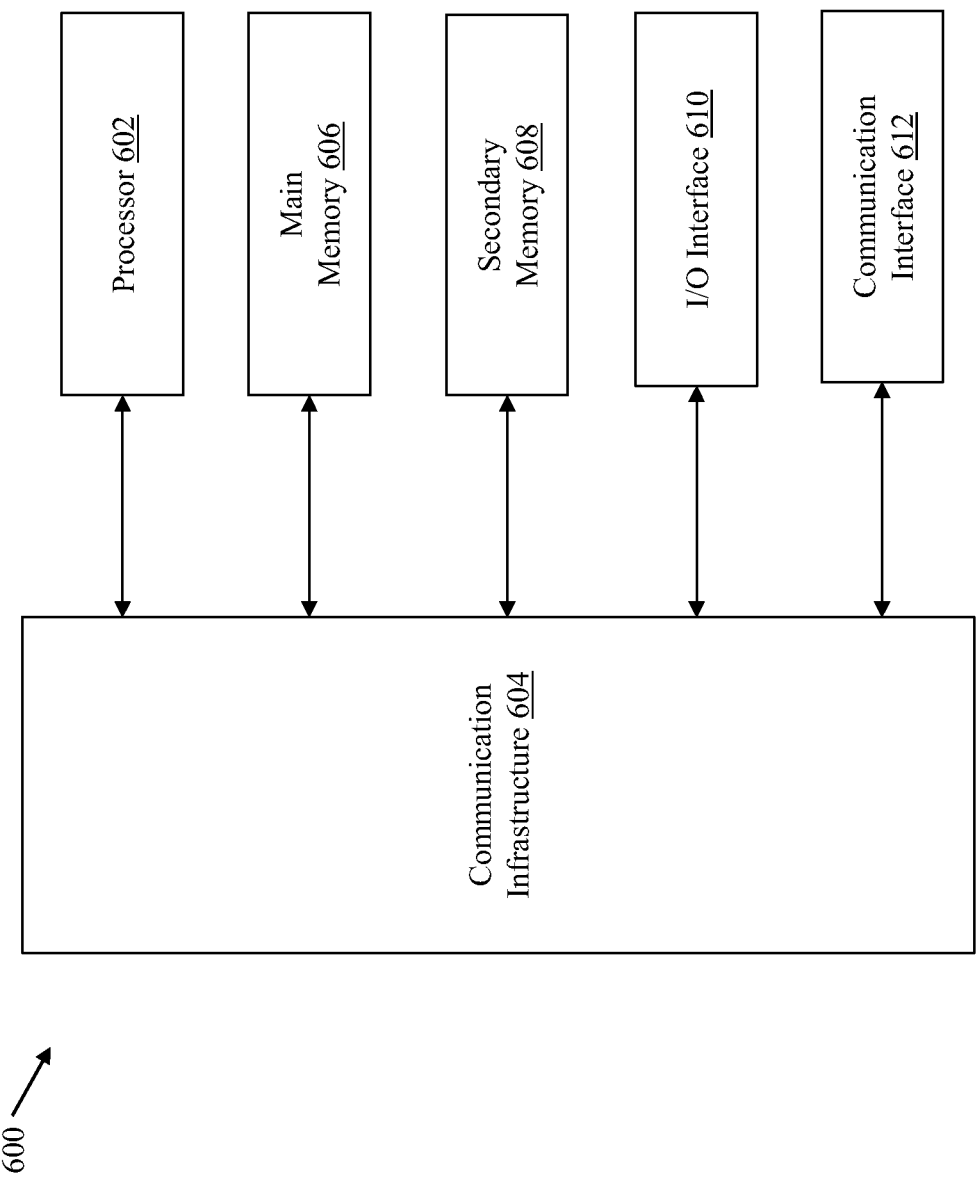
FIG. 6 is a block diagram that illustrates system architecture of a computer system, in accordance with an embodiment of the present disclosure.

FIG. 6 is a block diagram that illustrates system architecture of a computer system 600, in accordance with an embodiment of the present disclosure. An embodiment of present disclosure, or portions thereof, may be implemented as computer readable code on the computer system 600. In one example, the merchant terminal 102, the acquirer server 104, the payment network server 106, and the issuer server 108 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 7A-7B and 8.

The computer system 600 includes a processor 602 that may be a special-purpose or a general-purpose processing device. The processor 602 may be a single processor, multiple processors, or combinations thereof. The processor 602 may have one or more processor cores. The processor 602 may be connected to a communication infrastructure 604, such as a bus, message queue, multi-core message-passing scheme, and the like. The computer system 600 may further include a main memory 606 and a secondary memory 608. Examples of the main memory 606 may include RAM, ROM, and the like. The secondary memory 608 may include a hard disk drive or a removable storage drive, such as a floppy disk drive, a magnetic tape drive, a compact disc, an optical disk drive, a flash memory, and the like.

The computer system 600 further includes an input/output (I/O) interface 610 and a communication interface 612. The I/O interface 610 includes various input and output devices that are configured to communicate with the processor 602. Examples of the input devices may include a keyboard, a mouse, a joystick, a touchscreen, a microphone, and the like. Examples of the output devices may include a display screen, a speaker, headphones, and the like. The communication interface 612 may be configured to allow data to be transferred between the computer system 600 and various devices that are communicatively coupled to the computer system 600. Examples of the communication interface 612 may include a modem, a network interface, i.e., an Ethernet card, a communication port, and the like. Data transferred via the communication interface 612 may correspond to signals, such as electronic, electromagnetic, optical, or other signals as will be apparent to a person skilled in the art. The signals may travel via a communication channel (not shown) which may be configured to transmit the signals to devices that are communicatively coupled to the computer system 600. Examples of the communication channel may include, but are not limited to, cable, fiber optics, a phone line, a cellular phone link, a radio frequency link, and the like.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into digitally any device. For instant, at least one processor such as the processor 602 and a memory such as the main memory 606 and the secondary memory 608 implements the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Figure 7A:
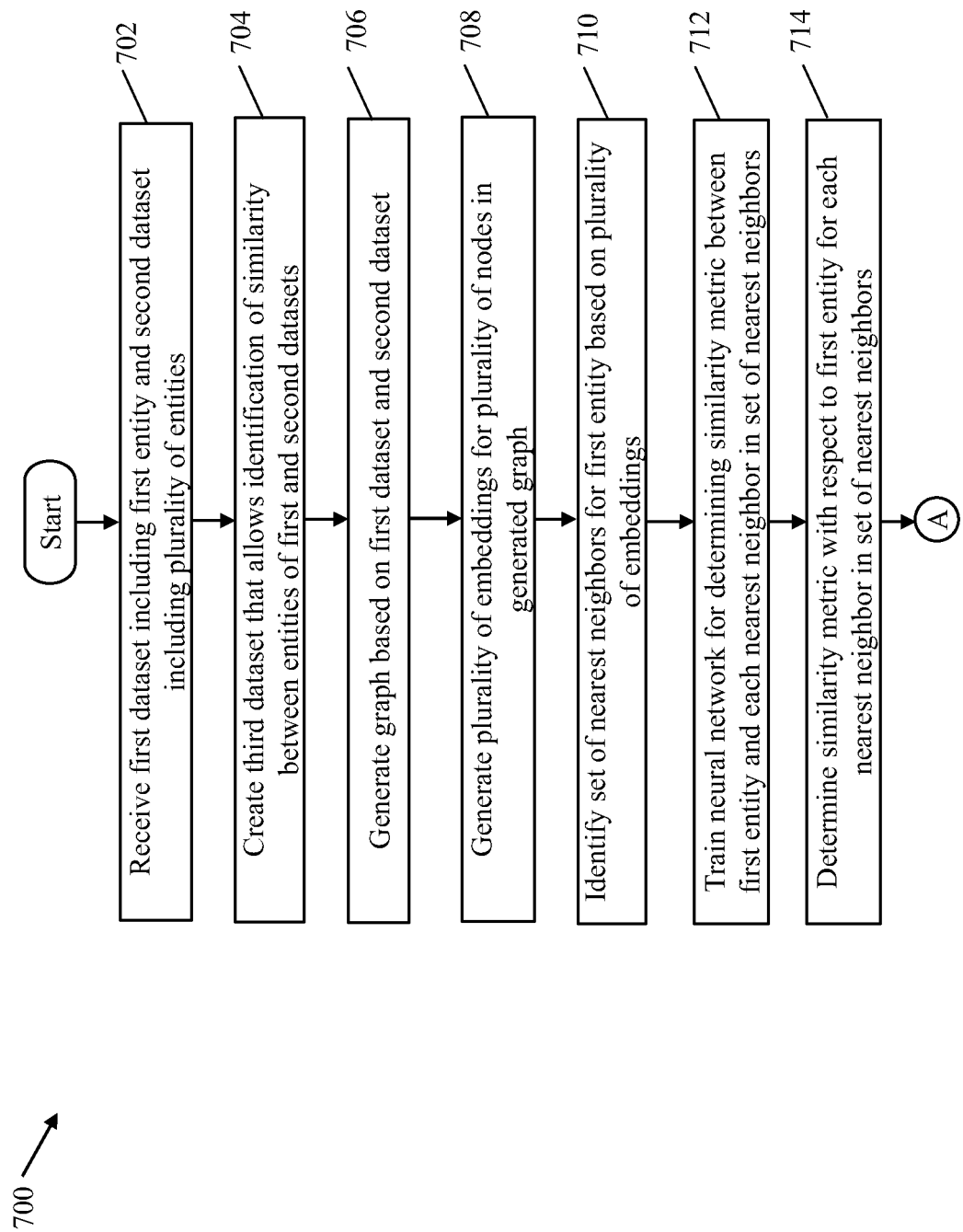
FIGS. 7A and 7B, collectively represent a flow chart that illustrates a method to implement entity resolution, in accordance with an exemplary embodiment of the present disclosure.
Figure 7B:
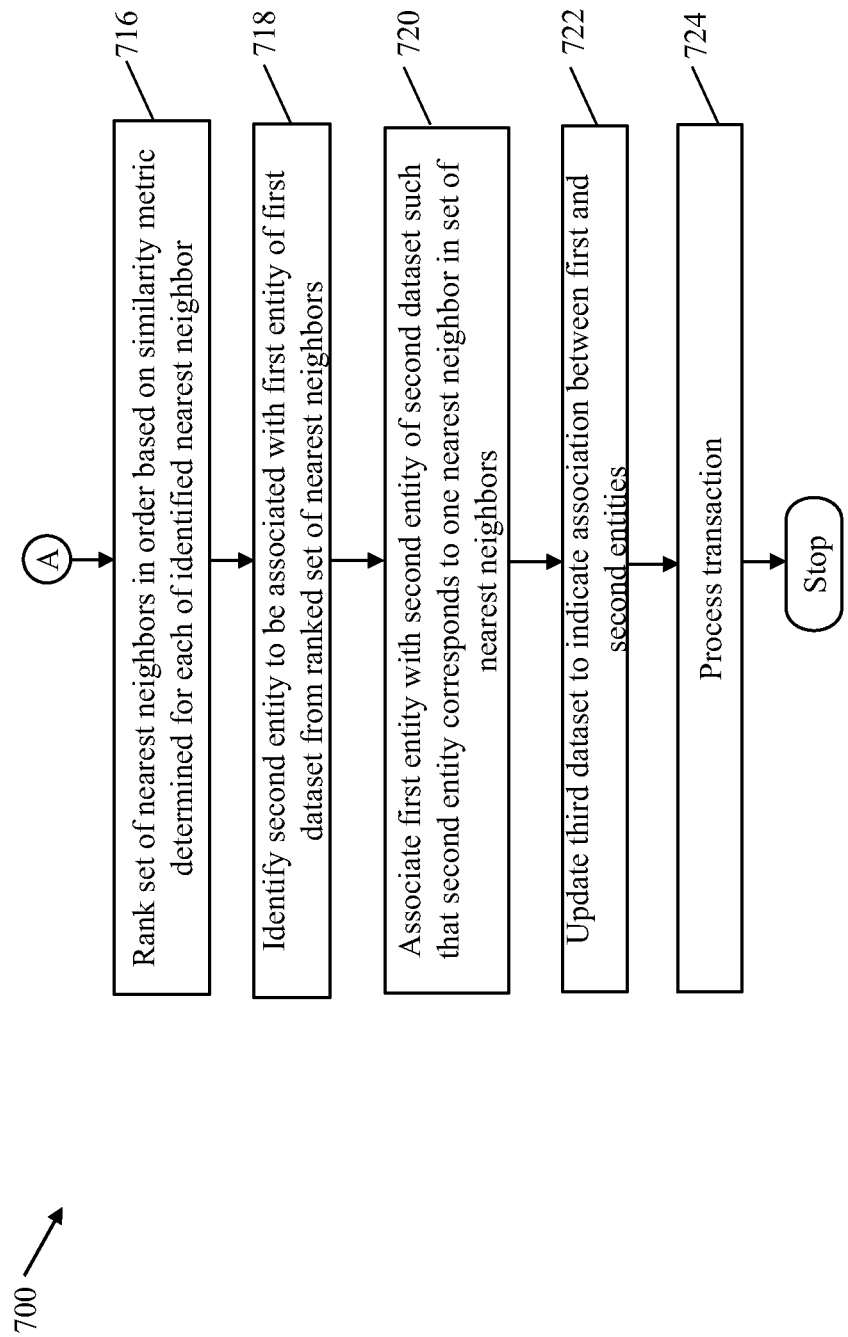

FIGS. 7A and 7B, collectively represent a flow chart 700 that illustrates a method to implement entity resolution, in accordance with an embodiment of the present disclosure.

With reference to FIG. 7A, at step 702, the payment network server 106 receives a first dataset (e.g., the first dataset 210a or the transaction dataset 504) including a first entity (e.g., the merchant entity 'Domino's 134') and a second dataset (e.g., the second dataset 210b or the stored dataset 502) including a plurality of entities. The payment network server 106 may receive (or obtain) the first dataset based on the transaction data (or request) received from the acquirer server 104. Further, the payment network server 106 may receive (or retrieve) the second dataset from the memory 204.

At step 704, the payment network server 106 creates a third dataset (e.g., the third dataset 210c or the linking dataset 506) that allows identification of similarity between entities of the first and second datasets. In other words, the payment network server 106 may use, for each transaction, the third dataset as reference for processing the corresponding transaction.

At step 706, the payment network server 106 generates a graph (e.g., the graph 302 or the graph 508) based on the first dataset and the second dataset. The graph includes a plurality of nodes and a plurality of edges connecting the plurality of nodes such that each node in the generated graph may correspond to the first entity of the first dataset or one of the plurality of entities of the second dataset. At step 708, the payment network server 106 generates a plurality of embeddings (e.g., the embeddings 310a-310n or the embeddings 512a-512n) for the plurality of nodes in the generated graph. Each of the plurality of embeddings associated with the first entity or one of the plurality of entities are determined based on a deep-learning model. In one example, the deep-learning model may be DeepWalk. Each of the plurality of embeddings represent the first entity or one of the plurality of entities in the generated graph as a point in a d-dimensional embedding space. The use of the deep-learning model to generate the plurality of embeddings is as described in the foregoing descriptions of FIGS. 3A-3F. At step 710, the payment network server 106 identifies a set of nearest neighbors (e.g., the set of nearest neighbors 314 or the set of nearest neighbors 514) for the first entity based on the plurality of embeddings. The payment network server 106 may execute a nearest neighbor algorithm to identify the set of nearest neighbors for the first entity. In one example, the nearest neighbor algorithm may be ANNOY algorithm.

At step 712, the payment network server 106 trains an artificial neural network (e.g., the neural network 316) to determine a similarity metric between the first entity and each nearest neighbor in the set of nearest neighbors. Here, the payment network server 106 may train the neural network based on the triplet loss function to accurately determine the degree of similarity between the first entity and each of the identified nearest neighbors. At step 714, the payment network server 106 determines the similarity metric (i.e., the similarity metric column as shown in FIG. 5F) for each nearest neighbor in the set of nearest neighbors with respect to the first entity. In one example, the similarity metric for each nearest neighbor with respect to the first entity may be determined based on the triplet loss function.

With reference to FIG. 7B, at step 716, the payment network server 106 ranks the set of nearest neighbors (e.g., the set of nearest neighbors 314 or the set of nearest neighbors 514) in an order based on the similarity metric determined for each of the identified nearest neighbor. Ranking of the nearest neighbors is described in conjunction with FIGS. 3F and 5F. At step 718, the payment network server 106 identifies a second entity of the second dataset to be associated with the first entity of the first dataset based on the determined similarity metric and the ranking of the nearest neighbors. At step 720, the payment network server 106 associates the first entity with the identified second entity of the second dataset that corresponds to a nearest neighbor in the set of nearest neighbors. For example, the merchant entity (Domino's 134) in the transaction dataset 504 is associated with the merchant entity ('134 Domino's') in the stored dataset 502 based on the determined similarity metric. At step 722, the payment network server 106 updates the third dataset (e.g., the third dataset 210c or 506) based on the association between the first and second entities. The payment network server 106 may use the third dataset as a reference for entity resolution in future transactions. At step 724, the payment network server 106 processes the transaction that corresponds to the first entity.

Figure 8:
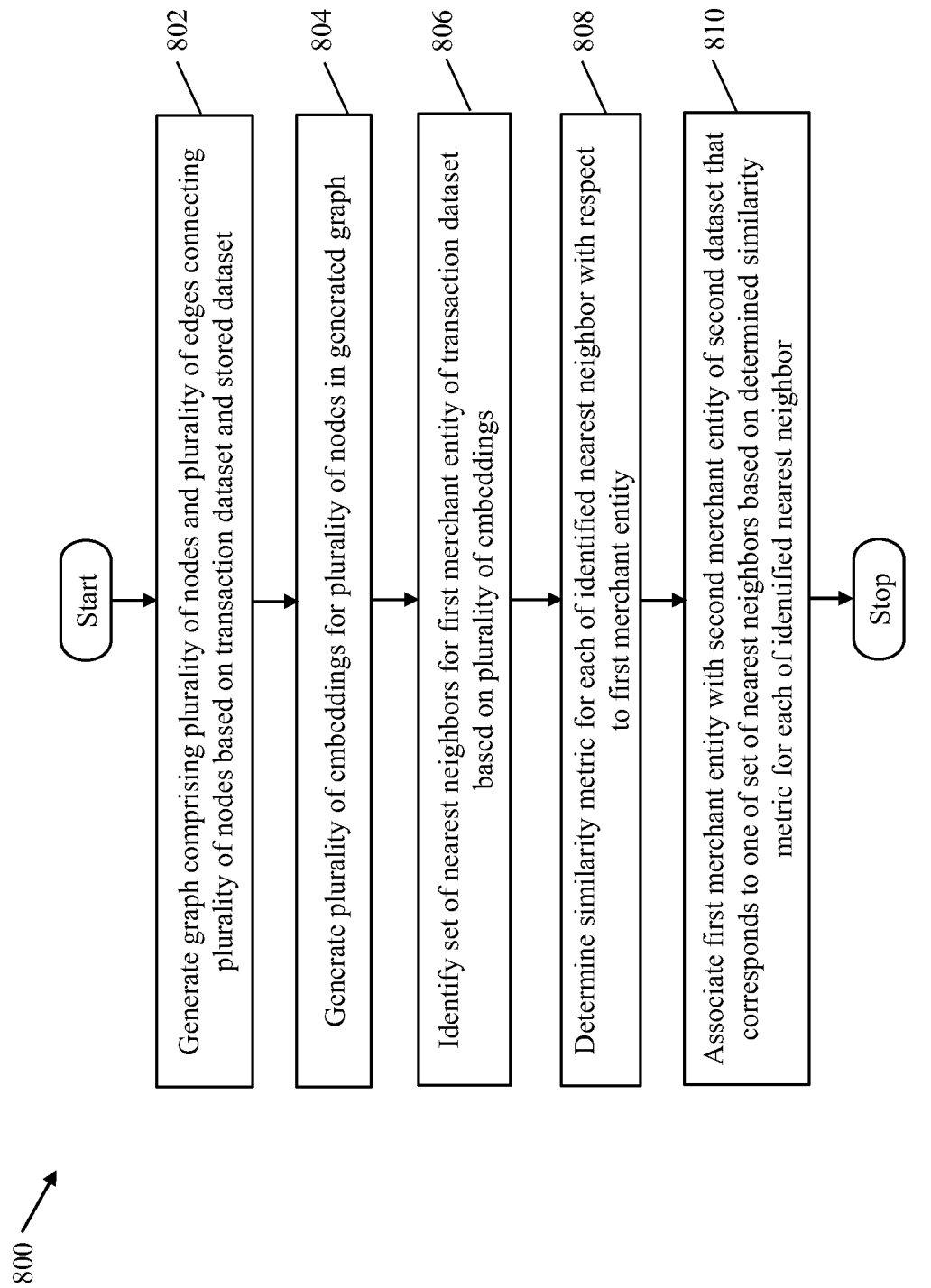
FIG. 8 represents a high-level flow chart that illustrates the method for implementing merchant entity resolution in transactions, in accordance with an exemplary embodiment of the present disclosure.

FIG. 8 represents a high-level flow chart 800 that illustrates a method for implementing merchant entity resolution in transactions, in accordance with an embodiment of the present disclosure.

At step 802, the payment network server 106 generates the graph 508 comprising the plurality of nodes and the plurality of edges connecting the plurality of nodes based on the transaction dataset 504 and the stored dataset 502. The transaction dataset 504 includes a first merchant entity (e.g., 'Domino's 134') and the second dataset includes a plurality of entities (e.g., '134 Domino's', 'Dominos #11', or the like). At step 804, the payment network server 106 generates a plurality of embeddings (e.g., the embeddings 512a-512n) for the plurality of nodes in the generated graph 508. At step 806, the payment network server 106 identifies the set of nearest neighbors 514 for the first merchant entity of the transaction dataset 504 based on the plurality of embeddings 512a-512n. At step 808, the payment network server 106 determines the similarity metric for each of the identified nearest neighbor (e.g., '134 Domino's', 'Dominos #11', or 'Domino Shoes') with respect to the first merchant entity (e.g., 'Domino's 134'). At step 810, the payment network server 106 associates the first merchant entity (e.g., 'Domino's 134') with a second merchant entity (e.g., '134 Domino's') of the stored dataset 502 that corresponds to one of the set of nearest neighbors 514 based on the determined similarity metric for each of the identified nearest neighbor.

Thus, the environment 100 enables execution of entity resolution at the payment network server 106, the acquirer server 104, or the issuer server 108. Technological improvements in the payment network server 106 (by way of the entity resolution functionality described in FIGS. 3A-3E) allow the payment network server 106 to execute fast merchant entity resolution for processing transactions. Further, the integration of graph embedding in the payment network server 106 for entity resolution provides a quality experience of maintaining transaction data and reduces time complexity. Moreover, the payment network server 106 integrated with the graph embedding functionality can execute entity resolution on high volume of data with reduced time complexity. The solution provided by the disclosure can be scaled to implement at any server that needs entity resolution for any type of transaction.

Techniques consistent with the present disclosure provide, among other features, systems and methods for entity resolution. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

The invention claimed is:

1. A method for facilitating entity resolution during an electronic payment transaction, the method comprising:

receiving, at a payment network server, a transaction request for payment to a first entity including a first entity name and location, where the first entity name and location match two or more entities from a plurality of entities known to the payment network server;

generating, at the payment network server, a graph comprising a plurality of nodes and a plurality of edges connecting the plurality of nodes, based on a first dataset and a second dataset, wherein the first dataset comprises the first entity and the second dataset comprises the plurality of entities, and wherein each node in the generated graph corresponds to the first entity or one of the plurality of entities;

generating, by the payment network server, a plurality of embeddings for the plurality of nodes in the generated graph, wherein each of the plurality of embeddings represents the first entity or one of the plurality of entities as a point in a d-dimensional embedding space;

identifying, by the payment network server, based on the plurality of embeddings, a set of nearest neighbors for the first entity;

training a neural network by a neural network training engine utilizing a triplet location-based loss function based upon location between the plurality of entities to determine a similarity metric between the first entity and each nearest neighbor in the set of nearest neighbors;

determining, by the payment network server, the similarity metric with respect to the first entity for each nearest neighbor in the set of nearest neighbors based upon the trained neural network, wherein the similarity metric for each nearest neighbor measures a degree of similarity between the first entity and the corresponding nearest neighbor, wherein each similarity metric for each nearest neighbor is based on a similarity between the first entity name and location and a corresponding name and location for each neighboring node, wherein the similarity metric is a proximity measure related to cosine similarity or Euclidian distance that indicates a degree of similarity between a pair of embeddings related to entity name and location, wherein the embeddings are generated in the graph in the d-dimensional embedding space, wherein the similarity metric between the first entity and each nearest neighbor is based upon the trained neural network to determine the degree of similarity between the first entity and each of the identified nearest neighbors, wherein the first entity is associated with a second entity based upon a determination that the similarity metric for the second entity is the closest of all other similarity metrics for the other nearest neighbors;

ranking, by the payment network server, the set of nearest neighbors to the first entity including the second entity in an order based on the similarity metric determined for each nearest neighbor based upon the trained neural network;

identifying, by the payment network server, from the ranked set of nearest neighbors, the second entity to be associated with the first entity of the first dataset;

sending, to an issuer, the transaction request for payment to the second entity;

receiving, from the issuer, a response to the transaction request for payment to the second entity; and responding to the transaction request for payment to the first entity based on the response for payment to the second entity.

2. The method of claim 1, further comprising updating, by the payment network server, the second dataset to indicate an association of the first entity with the second entity.

3. The method of claim 1, wherein, training the neural network by the neural network training engine to determine the similarity metric with respect to the first entity for each nearest neighbor in the set of nearest neighbors is implemented by the payment network server.

4. The method of claim 1, wherein at least one of the first entity name and first entity location has no exact match among the two or more entities from the plurality of entities known to the payment network server.

5. A system for facilitating entity resolution, the system comprising:

a payment network server configured to:

receive, at a payment network server, a transaction request for payment to a first entity including a first entity name and location including first entity details, where the first entity name and location match two or more entities from a plurality of entities known to the payment network server;

generate a graph comprising a plurality of nodes and a plurality of edges that connect the plurality of nodes, based on a first dataset and a second dataset, wherein the first dataset comprises the first entity and the second dataset comprises the plurality of entities, and wherein each node in the generated graph corresponds to the first entity or one of the plurality of entities;

generate a plurality of embeddings for the plurality of nodes in the generated graph, wherein each of the plurality of embeddings represents the first entity or one of the plurality of entities as a point in a d-dimensional embedding space;

identify, based on the plurality of embeddings, a set of nearest neighbors for the first entity;

train a neural network based on a neural network training engine utilizing a triplet location-based loss function based upon location between the plurality of entities to determine a similarity metric between the first entity and each nearest neighbor in the set of nearest neighbors;

determine the similarity metric with respect to the first entity for each nearest neighbor in the set of nearest neighbors based upon the trained neural network, wherein the similarity metric for each nearest neighbor measures a degree of similarity between the first entity and the corresponding nearest neighbor, wherein each similarity metric for each nearest neighbor is based on a similarity between the first entity name and location and a corresponding name and location for each neighboring node, wherein the similarity metric is a proximity measure related to cosine similarity or Euclidian distance that indicates a degree of similarity between a pair of embeddings related to entity name and location, wherein the embeddings are generated in the graph in the d-dimensional embedding space, wherein the similarity metric between the first entity and each nearest neighbor is based upon the trained neural network to determine the degree of similarity between the first entity and each of the identified nearest neighbors, wherein the first entity is associated with a second entity based upon a determination that the similarity metric for the second entity is the closest of all other similarity metrics for the other nearest neighbors;

rank the set of nearest neighbors to the first entity including the second entity in an order based on the similarity metric determined for each nearest neighbor based upon the trained neural network;

identify from the ranked set of nearest neighbors, the second entity to be associated with the first entity of the first dataset;

send, to an issuer, the transaction request for payment to the second entity;

receive, from the issuer, a response to the transaction request for payment to the second entity; and respond to the transaction request for payment to the first entity based on the response for payment to the second entity.

6. The system of claim 5, wherein the payment server is further configured to update the second dataset based on the association of the first entity with the second entity.

7. The system of claim 5, wherein the payment server is further configured to instruct the neural network training engine to train the neural network to determine the similarity metric with respect to the first entity for each nearest neighbor in the set of nearest neighbors.

8. The system of claim 5, wherein at least one of the first entity name and first entity location has no exact match among the two or more entities from the plurality of entities known to the payment network server.

9. A method for facilitating merchant entity resolution in transactions, the method comprising:

receiving, at a payment network server, a transaction request for payment to a first merchant entity including a first merchant entity identifying details comprising a first entity name and location, where the first entity name and location identifying details at least partially match two or more merchant entities from a plurality of merchant entities known;

generating, by a payment network server, a graph comprising a plurality of nodes and a plurality of edges connecting the plurality of nodes, based on a transaction dataset comprising the first merchant entity and a stored dataset comprising the plurality of merchant entities, wherein each node in the generated graph corresponds to the first merchant entity or one of the plurality of merchant entities;

generating, by the payment network server, a plurality of embeddings for the plurality of nodes in the generated graph, wherein each of the plurality of embeddings represents the first merchant entity or one of the plurality of merchant entities as a point in a d-dimensional embedding space;

identifying, by the payment network server, based on the plurality of embeddings, a set of nearest neighbors for the first merchant entity;

training a neural network by a neural network training engine utilizing a triplet location-based loss function based upon location between the plurality of entities to determine a similarity metric between the first entity and each nearest neighbor in the set of nearest neighbors;

determining, by the payment network server, the similarity metric with respect to the first merchant entity for each nearest neighbor in the set of nearest neighbors based upon the trained neural network, wherein the similarity metric for each nearest neighbor measures a degree of similarity between the first merchant entity and the corresponding nearest neighbor, wherein each similarity metric for each nearest neighbor is based on a similarity between the first entity name and location and a corresponding name and location for each neighboring node, wherein the similarity metric is a proximity measure related to cosine similarity or Euclidian distance that indicates a degree of similarity between a pair of embeddings related to entity name and location, wherein the embeddings are generated in the graph in the d-dimensional embedding space, wherein the similarity metric between the first entity and each nearest neighbor is based upon the trained neural network to determine the degree of similarity between the first entity and each of the identified nearest neighbors, wherein the first entity is associated with a second entity based upon a determination that the similarity metric for the second entity is the closest of all other similarity metrics for the other nearest neighbors;

ranking, by the payment network server, the set of nearest neighbors to the first entity including the second entity in an order based on the similarity metric determined for each nearest neighbor based upon the trained neural network;

identifying, by the payment network server, from the ranked set of nearest neighbors, the second merchant entity to be associated with the first merchant entity of the first dataset;

sending, to an issuer, the transaction request for payment to the second merchant entity;

receiving, from the issuer, a response to the transaction request for payment to the second merchant entity; and responding to the transaction request for payment to the first merchant entity based on the response for payment to the second merchant entity.

10. The method of claim 9, wherein, training the neural network by the neural network training engine to determine the similarity metric with respect to the first merchant entity for each nearest neighbor in the set of nearest neighbors is implemented by the payment network server.

11. The method of claim 9, wherein at least one of the first merchant entity name and first merchant entity location has no exact match among the two or more merchant entities from the plurality of merchant entities known to the payment network server.

* * * * *